(12) United States Patent
Siddiqui et al.

(10) Patent No.: US 8,770,526 B2
(45) Date of Patent: *Jul. 8, 2014

(54) ELECTRICAL BOX SUPPORT ASSEMBLY

(75) Inventors: Asim Siddiqui, Elgin, IL (US); Anthony Caringella, Norridge, IL (US); Tom Colangelo, Lombard, IL (US)

(73) Assignee: Illinois Tool Works Inc., Glenview, IL (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/117,837

(22) Filed: May 27, 2011

(65) Prior Publication Data

US 2012/0298816 A1 Nov. 29, 2012

(51) Int. Cl.
*A47B 96/06* (2006.01)
*A47F 5/00* (2006.01)
*H02G 3/08* (2006.01)

(52) U.S. Cl.
USPC ... 248/205.1; 248/906; 248/300; 248/222.12; 248/229.16; 248/229.26; 248/644; 248/200.1; 248/227.3; 248/227.4; 174/58; 220/3.2; 220/3.7; 220/3.9

(58) Field of Classification Search
USPC ............... 248/351, 906, 205.1, 300, 222.12; 248/229.16, 221.11, 229.26, 72, 228.1, 644, 248/200.1, 227.3, 227.4, 611; 174/58; 220/3.9, 3.2, 3.7; 362/365–366; 52/715
See application file for complete search history.

(56) References Cited

U.S. PATENT DOCUMENTS

| | | | | |
|---|---|---|---|---|
| 2,466,912 A | | 4/1949 | Frederick | |
| 3,588,019 A | * | 6/1971 | Cozcek | 48/228.6 |
| 3,720,395 A | * | 3/1973 | Schuplin | 248/228.7 |
| 3,730,466 A | | 5/1973 | Swanquist | |
| 3,780,209 A | * | 12/1973 | Schuplin | 174/51 |
| 3,804,359 A | * | 4/1974 | Cumber | 248/205.1 |
| 4,362,284 A | * | 12/1982 | Bolante | 248/228.7 |
| 4,971,280 A | | 11/1990 | Rinderer | |
| 5,004,199 A | * | 4/1991 | Suk | 248/218.4 |
| 5,141,185 A | | 8/1992 | Rumbold et al. | |
| 5,386,959 A | | 2/1995 | Laughlin et al. | |
| 5,579,939 A | * | 12/1996 | Bourassa | 220/3.3 |
| 5,810,303 A | * | 9/1998 | Bourassa et al. | 248/205.1 |

(Continued)

OTHER PUBLICATIONS

European Patent Office, International Searching Authority, International Search Report and Written Opinion of PCT/US2012/039635, Date of Mailing Aug. 6, 2013, 11 pages.

(Continued)

*Primary Examiner* — Terrell McKinnon
*Assistant Examiner* — Christopher Garft
(74) *Attorney, Agent, or Firm* — Klintworth & Rozenblat IP LLC

(57) ABSTRACT

An electrical box support assembly for mounting an electrical box between a pair of studs is provided. The electrical box support assembly includes, but is not limited to, a pair of telescoping overlapping struts and a pair of engaging tabs detachably coupled with each end of the pair of telescoping overlapping struts. Each strut has a face to which the electrical box may be secured. Each of the pair of engaging tabs includes a first engagement member for primarily engaging a closed face of one of the studs and a side engagement member connected generally perpendicular with the first engagement member. Each end of the pair of telescoping overlapping struts may be detachably coupled at one of two positions on each engaging tab in order to accommodate electrical boxes of varying depths.

18 Claims, 28 Drawing Sheets

(56) References Cited

U.S. PATENT DOCUMENTS

| | | |
|---|---|---|
| 6,389,658 B1 * | 5/2002 | Pfaller et al. .................... 24/545 |
| 8,177,176 B2 * | 5/2012 | Nguyen et al. ............. 248/200.1 |
| 2005/0092510 A1 | 5/2005 | Dinh |
| 2007/0057130 A1 | 3/2007 | Nikayin et al. |
| 2008/0142646 A1 | 6/2008 | Magno et al. |
| 2010/0050561 A1 | 3/2010 | Jafari |
| 2012/0298816 A1 | 11/2012 | Siddiqui et al. |

OTHER PUBLICATIONS

European Patent Office, International Searching Authority, International Search Report and Written Opinion of PCT/US2013/025682, Date of Mailing May 14, 2013, 12 pages.

* cited by examiner

ELECTRICAL BOX SUPPORT ASSEMBLY

BACKGROUND OF THE INVENTION

Certain applications require use of a two part telescoping strut for supporting an electrical box or similar device in a studded wall. The strut includes two horizontally adjustable telescoping parts which are used to adjust the length of the strut to match the distance in between a pair of studs for proper mounting of the strut to the pair of studs. The strut includes a fastening mechanism, such as an outwardly opening V-shape horizontal groove, to facilitate positioning, alignment and fastening of such boxes to the strut. The driving of a fastener from the box to the fastening mechanism, not only aligns and fastens the box with the strut, but also secures the two horizontally adjustable telescoping parts of the strut together.

Unfortunately electrical boxes come in two separate depths which requires different spacing or set back of the strut from the edges of the studs for each box depth size. Therefore, a customer or installer would require different types of struts for different box depths even though the only difference in the struts would be a difference in the pre-bent ends or flanges by means of which the strut parts are secured to the studs. Pre-bent flanges for one type of stud mounting make it difficult if not impossible to mount the strut in any other fashion. This problem has created shipping and inventory problems for customers which required field selection of the right strut for the right box, and for the right stud mounting application.

Additionally, when fastening the strut to a stud, an installer would typically need to hold the strut with one and a fastener, such as a screw or nail, and fastening device, such as a screw driver or hammer, with another hand. The installer would then have to insert the fastener into the strut will holding the strut in the correction location on the stud, otherwise the strut would fall to the floor. Often times the installer would lose his or her grip on the strut and the strut would move or fall, resulting in possible misalignment of the fastened strut with the stud and a possible increase in the time required to install the box and fasten the strut to the stud.

It would therefore be desirable to have a strut having the box securing advantages of the noted prior art strut, which could quickly be field formed to accommodate the box depth, while at the same time could be readily mounted to any interior or exterior surface of a metal stud, or the exterior of a wood stud.

SUMMARY

The present invention is defined by the following claims, and nothing in this section should be taken as a limitation on those claims.

In one aspect, an electrical box support assembly for mounting an electrical box between a pair of studs is provided. The electrical box support assembly includes, but is not limited to, a pair of telescoping overlapping struts and a pair of engaging tabs detachably coupled with each end of the pair of telescoping overlapping struts. Each strut has a face to which the electrical box may be secured. Each of the pair of engaging tabs includes a first engagement member for primarily engaging a closed face of one of the studs and a side engagement member connected generally perpendicular with the first engagement member. Each end of the pair of telescoping overlapping struts may be detachably coupled at one of two positions on each engaging tab in order to accommodate electrical boxes of varying depths.

In one aspect, an electrical box support assembly for mounting an electrical box between a pair of studs is provided. The electrical box support assembly includes a pair of telescoping overlapping struts and a pair of engaging tabs detachably coupled with each end of the pair of telescoping overlapping struts. Each strut has a face to which the electrical box may be secured. Each of the pair of engaging tabs includes a first engagement member for primarily engaging a closed face of one of the studs, a second engagement member facing the first engagement member, a side engagement member connecting the first and second engagement members together, and a first compressible member extending from the first engagement member in a first direction $D_1$ from the first engagement member towards the second engagement member. The second engagement member is for primarily engaging a closed face of one of the studs. The first compressible member is compressible in a second direction $D_2$ opposite that of the first direction $D_1$.

In one aspect, an electrical box support assembly for mounting an electrical box between a pair of studs is provided. The electrical box support assembly includes a pair of telescoping overlapping struts and a pair of engaging tabs detachably coupled with each end of the pair of telescoping overlapping struts. Each strut has a face to which the electrical box may be secured. Each of the pair of engaging tabs includes a first engagement member facing a second engagement member, a side engagement member connecting the first and second engagement members together, and a first compressible member extending from either the first engagement member or the second engagement member. The first compressible member extends in a first direction $D_1$ either from the first engagement member towards the second engagement member or from the second engagement member towards the first engagement member. The first compressible member is compressible in a second direction $D_2$ opposite that of the first direction $D_1$.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Methods and devices consistent with the present invention overcome the disadvantages of conventional electrical box support assemblies by using a u-shaped engaging tab having a pair of opposing engagement members and by having a compressible member extending from one of the opposing engagement members and towards another of the opposing engagement members, it is possible to readily mount and easily secure the electrical box support assembly of the present invention to any interior or exterior surface of a metal stud, or the exterior of a wood stud, preferably without the use of additional fasteners.

Figure 1:
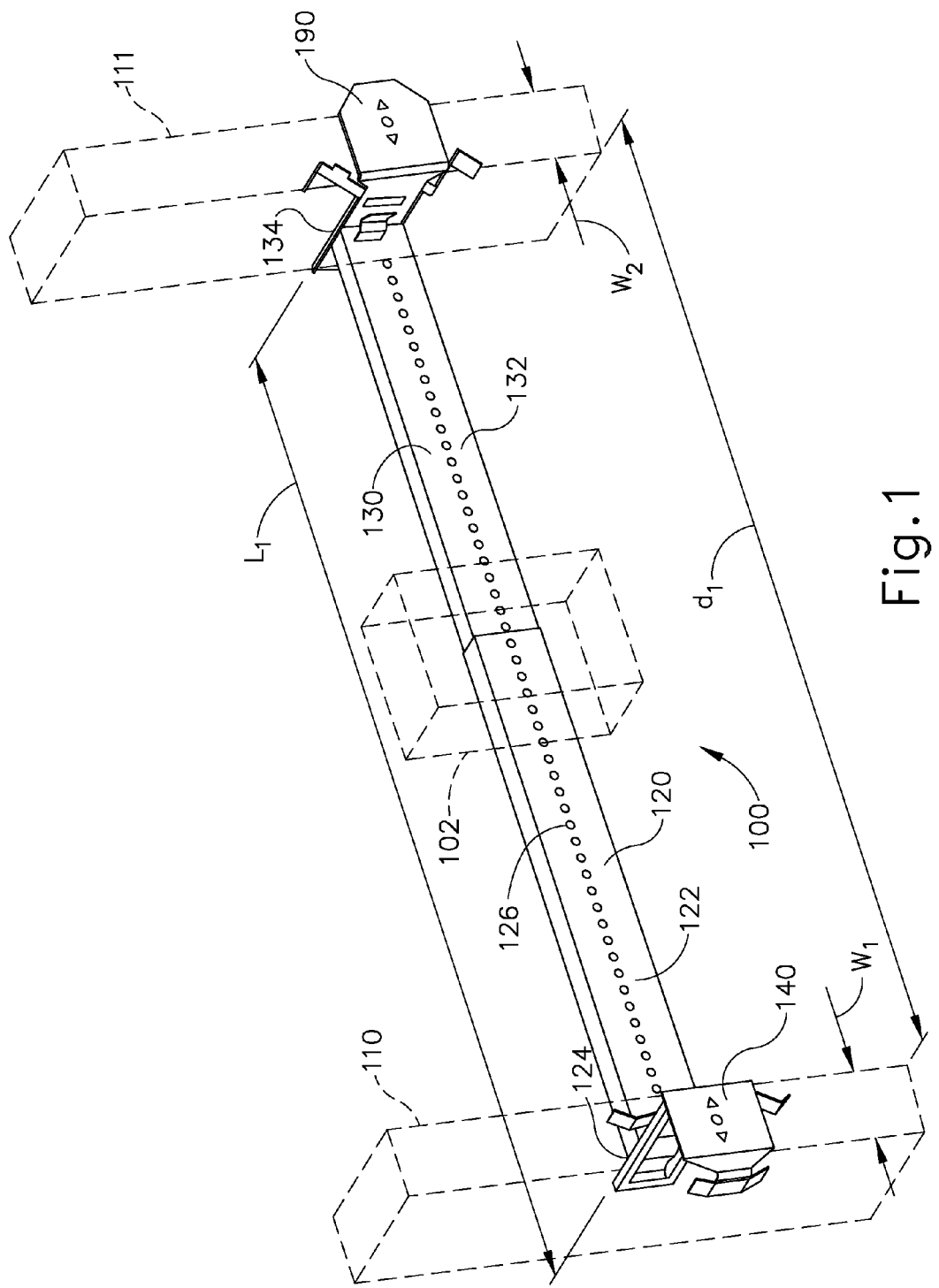
FIG. 1 depicts a perspective view of an electrical box support assembly for mounting an electrical box between a pair of studs, in accordance with one embodiment.

With reference to FIG. 1, there is shown one embodiment of an electrical box support assembly 100 for mounting an electrical box 102 between a pair of stud supports (studs) 110. Electrical box 102 can be any type of box-like structure used for housing cables (i.e. electrical cables, data cables, or communications cables). Preferably, electrical box 102 includes five sides which form a cavity and an open side for access to the cavity. In one embodiment, the electrical box 102 is mated with an electrical box cover to cover the cavity and shield and/or protect the cables housed within. Electrical box 102 is typically mounted inside a wall behind the wall or drywall and between the pair of studs 110.

Stud supports 110, or studs 110, are vertical members in light frame construction techniques called balloon framing and platform framing of a building's wall, also known as "stick and platform," "stick and frame," or "stick and box" construction colloquially. The 'sticks,' or studs 110, carry the vertical loads, and rectangular platforms surrounding the studs 110, made of floor joists, headers and sub-floors, hold the outward forces in check and keep the wall in parallel and from bulging. Studs 110 may be made of wood, usually 2×4 or 2×6 dimensional lumber. In North America, studs are typically placed a distance $d_1$ of approximately 16 inches (400 mm)±1 inch (±25 mm) from each other's center, but sometimes also at a distance $d_1$ of 12 inches (300 mm)±1 inch (±25 mm), or a distance $d_1$ of 24 inches (600 mm)±1 inch (±25 mm).

In one embodiment, studs 110 are made of steel with a variety of widths, such as a first width $W_1$ of 1.875 inches (47.5 mm)±0.25 inches (±6 mm) for an exterior stud 110, and a second width $W_2$ of 1.25 inches (31.75 mm)±0.25 inches (±6 mm) for an interior stud 110. Studs 110 may have additional widths as well, such as 1.625 inches (41.3 mm)±0.25 inches (±6 mm), 2.50 inches (63.5 mm)±0.25 inches (±6 mm), 3.625 inches (92 mm)±0.25 inches (±6 mm), 4.0 inches (101.6 mm)±0.25 inches (±6 mm), and 6 inches (152.4 mm)±0.25 inches (±6 mm).

Figure 5:
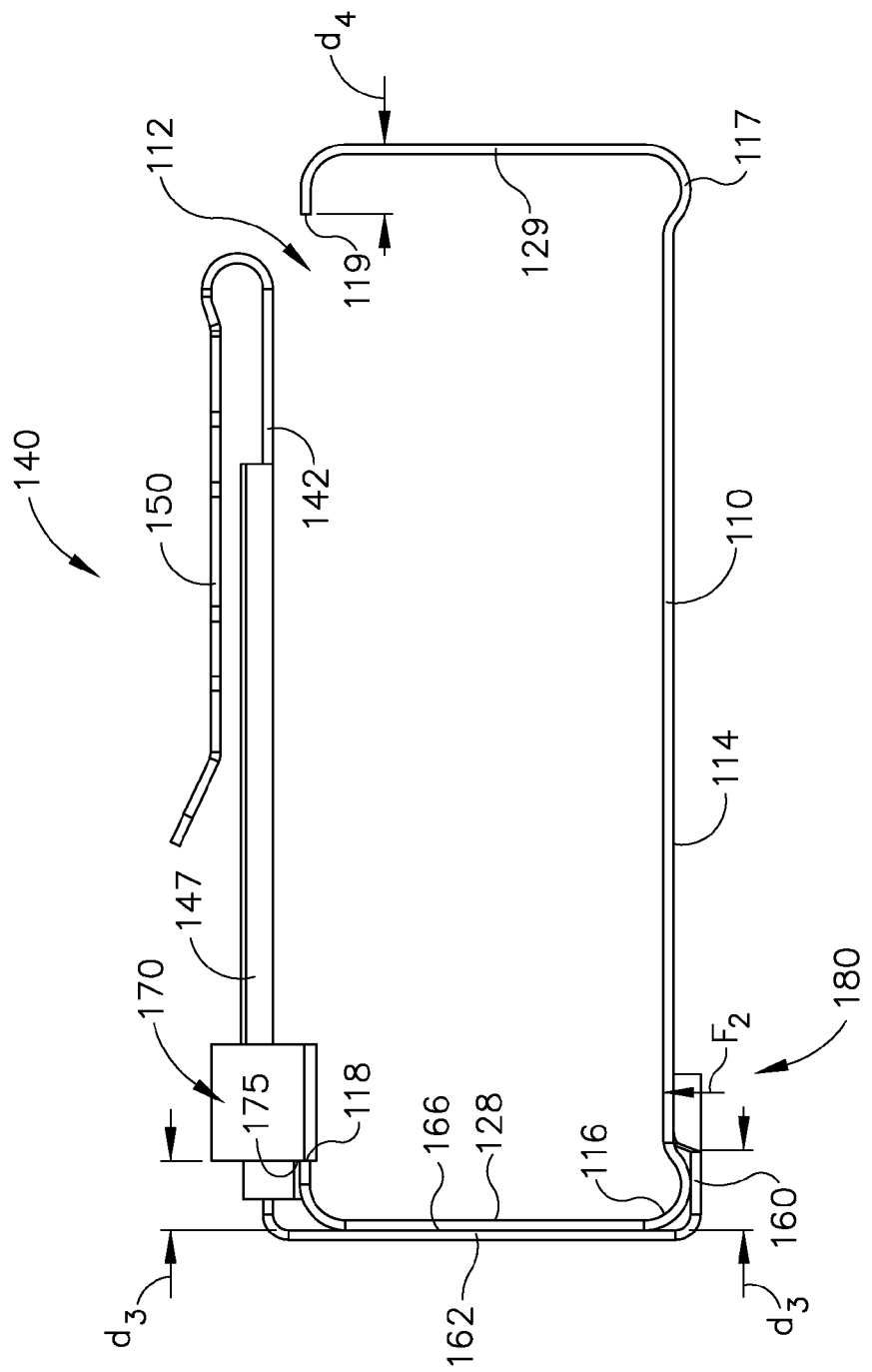
FIG. 5 depicts a second side view of the first engaging tab shown in FIG. 2 connected with a stud in a first manner, in accordance with one embodiment.
Figure 6:
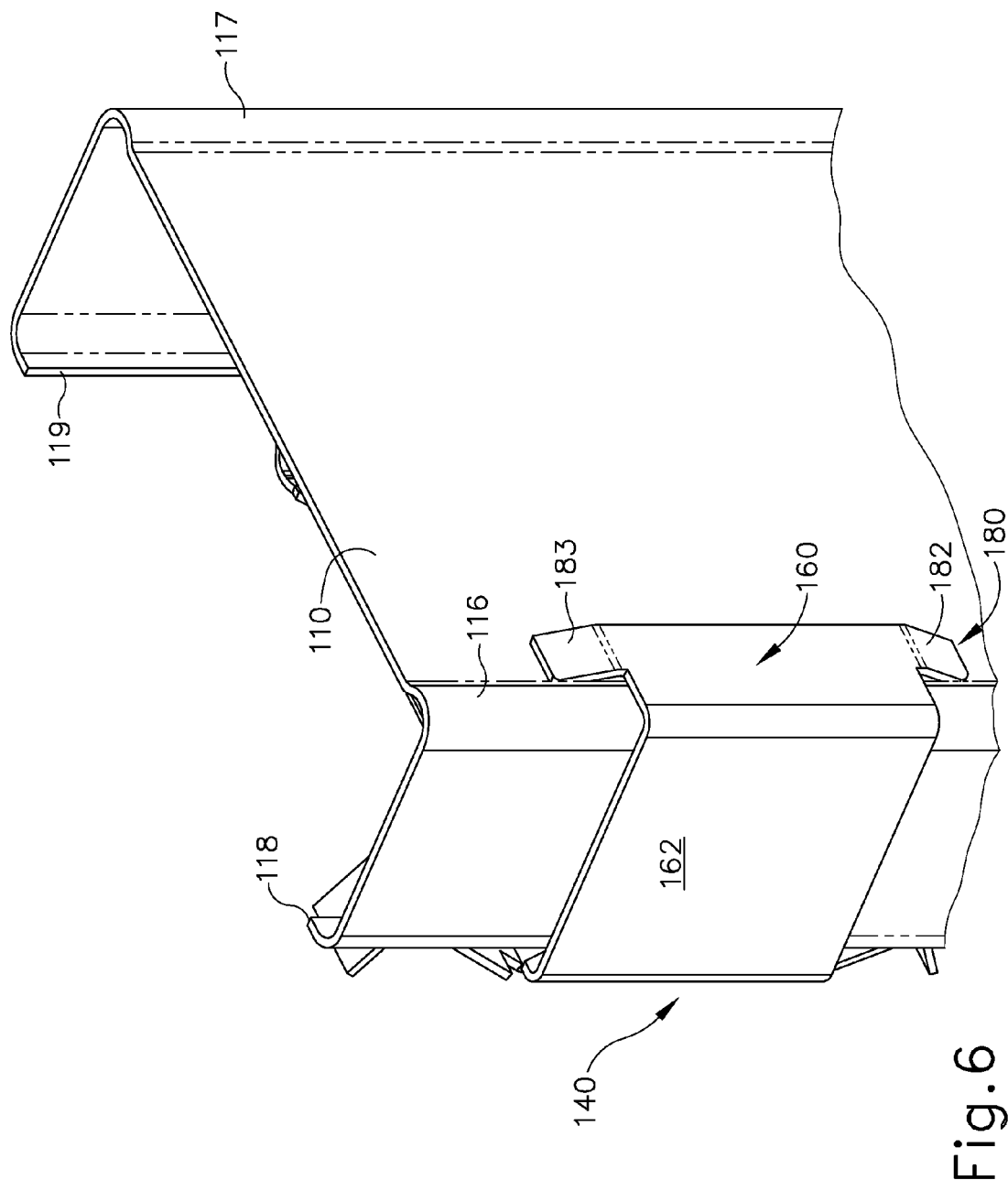
FIG. 6 depicts a first perspective view of the first engaging tab shown in FIG. 2 connected with a stud in a first manner, in accordance with one embodiment.
Figure 7:
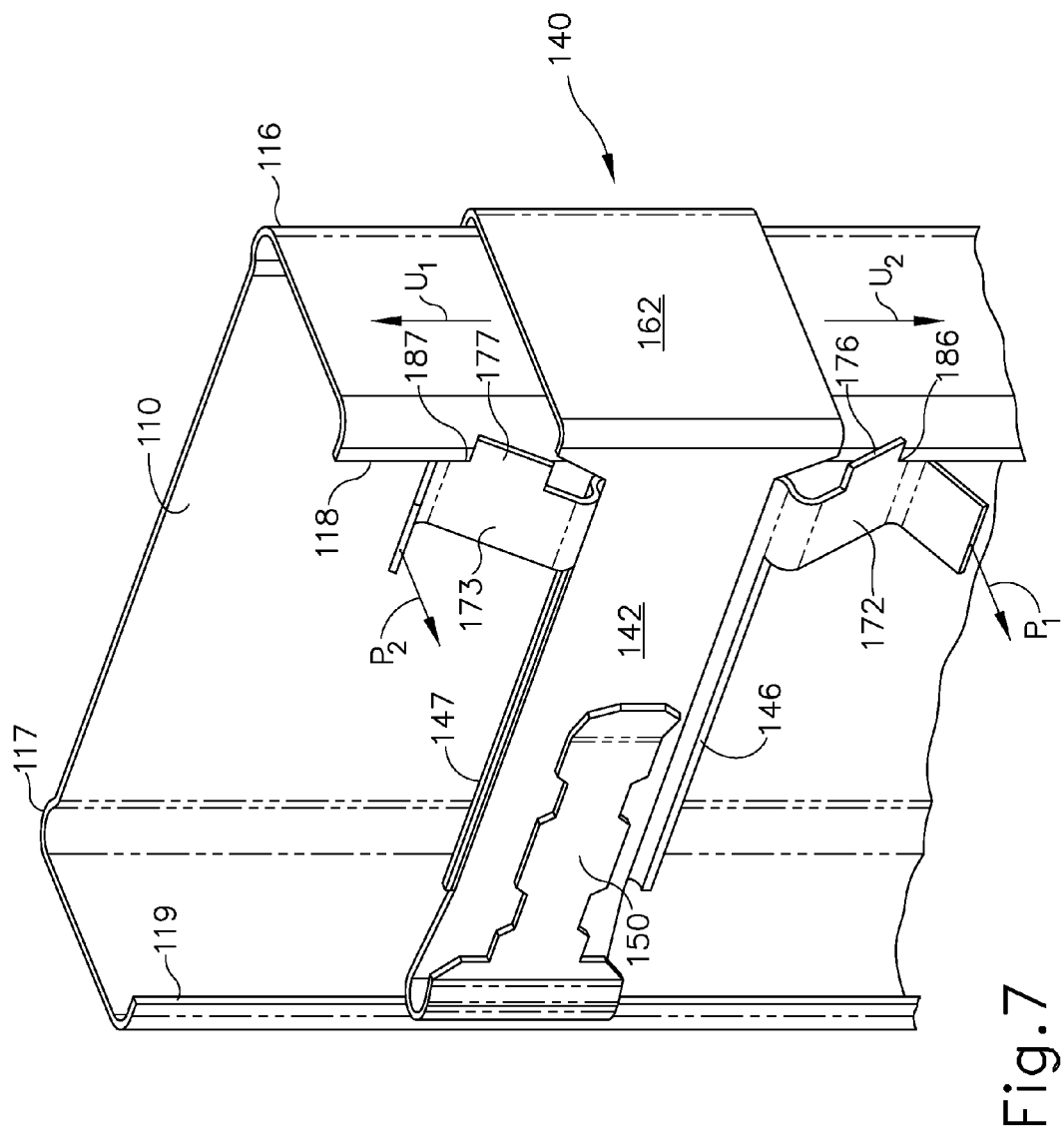
FIG. 7 depicts a second perspective view of the first engaging tab shown in FIG. 2 connected with a stud in a first manner, in accordance with one embodiment.
Figure 8:
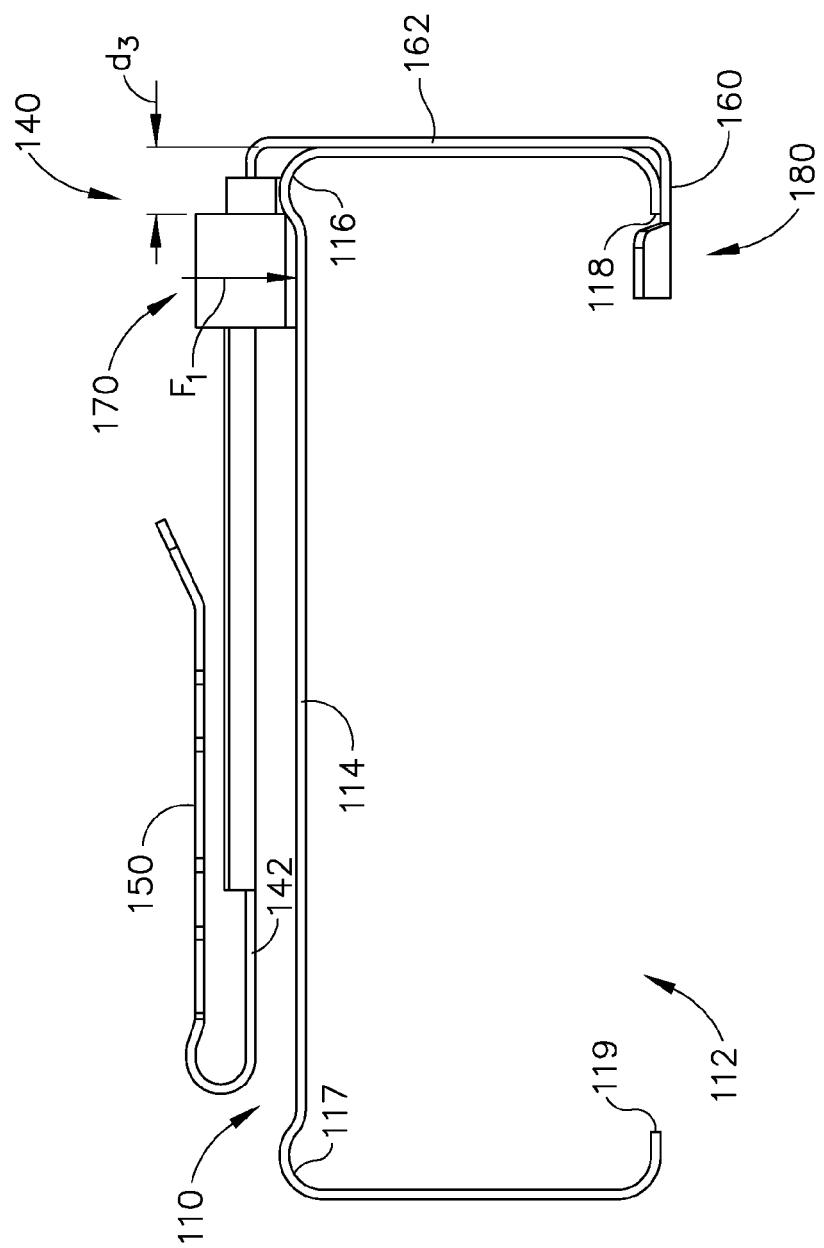
FIG. 8 depicts a side view of the first engaging tab shown in FIG. 2 connected with a stud in a second manner, in accordance with one embodiment.
Figure 9:
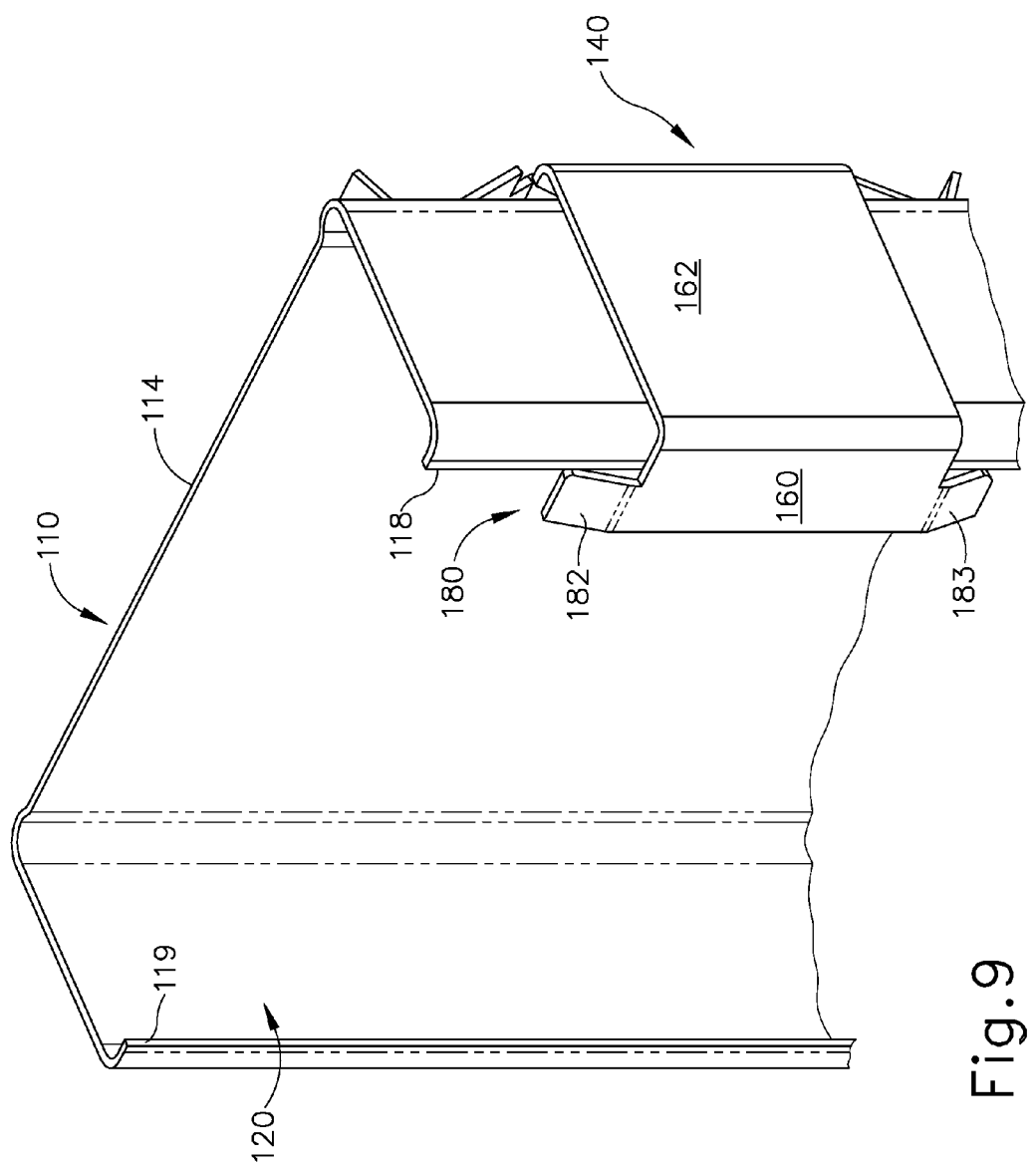
FIG. 9 depicts a first perspective view of the first engaging tab shown in FIG. 2 connected with a stud in a second manner, in accordance with one embodiment.
Figure 10:
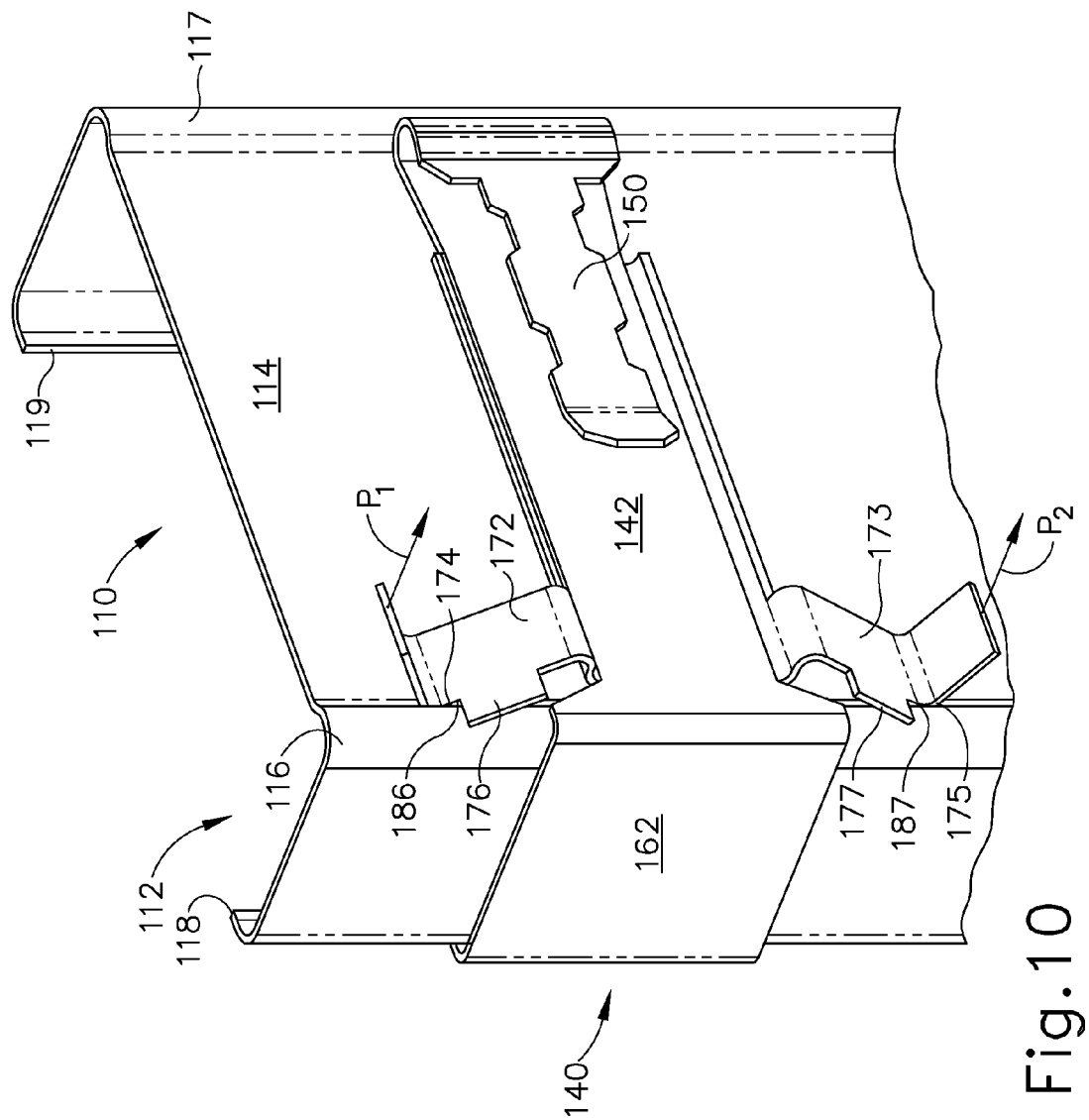
FIG. 10 depicts a second perspective view of the first engaging tab shown in FIG. 2 connected with a stud in a second manner, in accordance with one embodiment.
Figure 11:
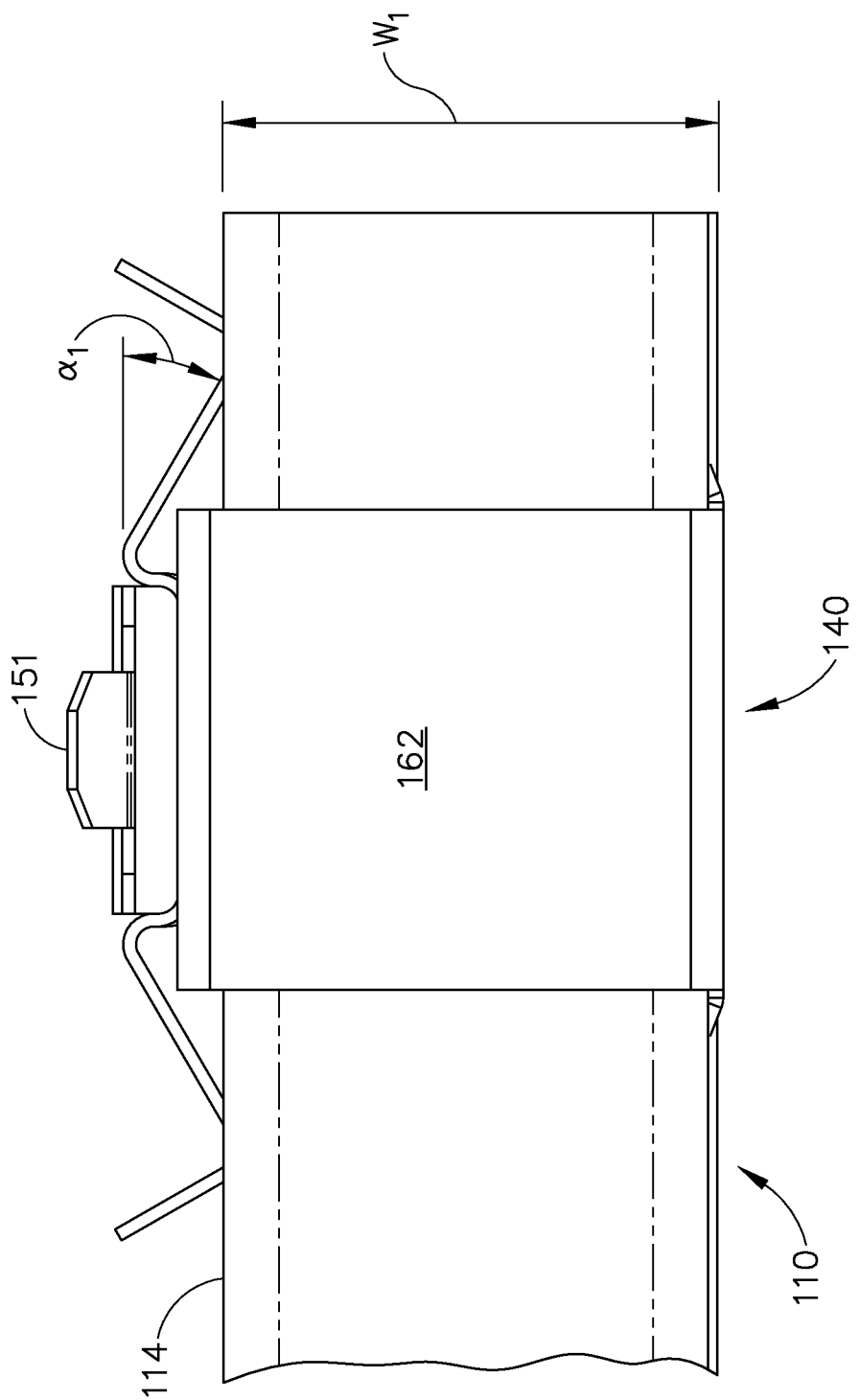
FIG. 11 depicts an alternate side view of the first engaging tab shown in FIG. 2 connected with a stud having a first width $W_1$, in accordance with one embodiment.
Figure 12:
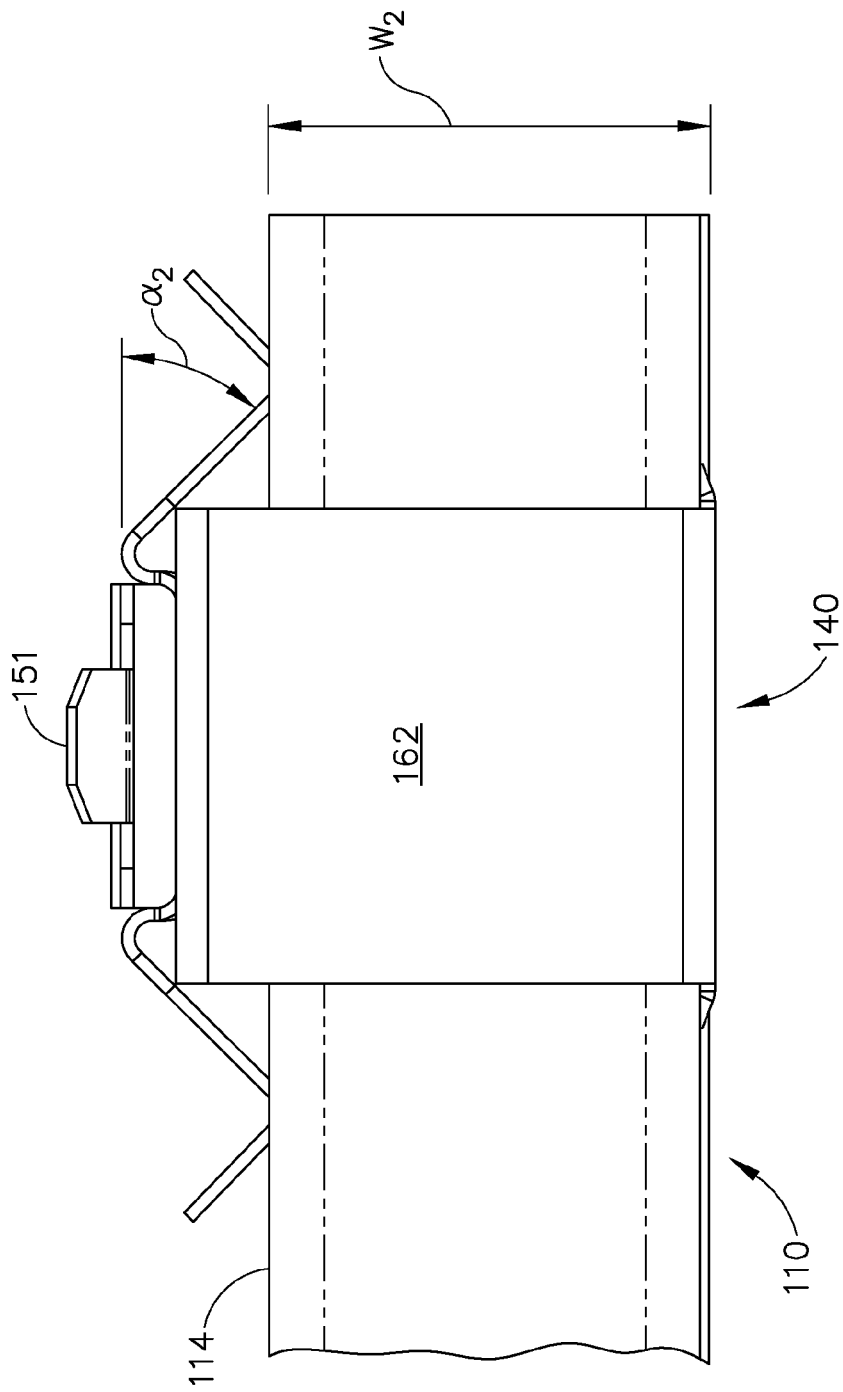
FIG. 12 depicts an alternate side view of the first engaging tab shown in FIG. 2 connected with a stud having a second width $W_2$, in accordance with one embodiment.
Figure 13:
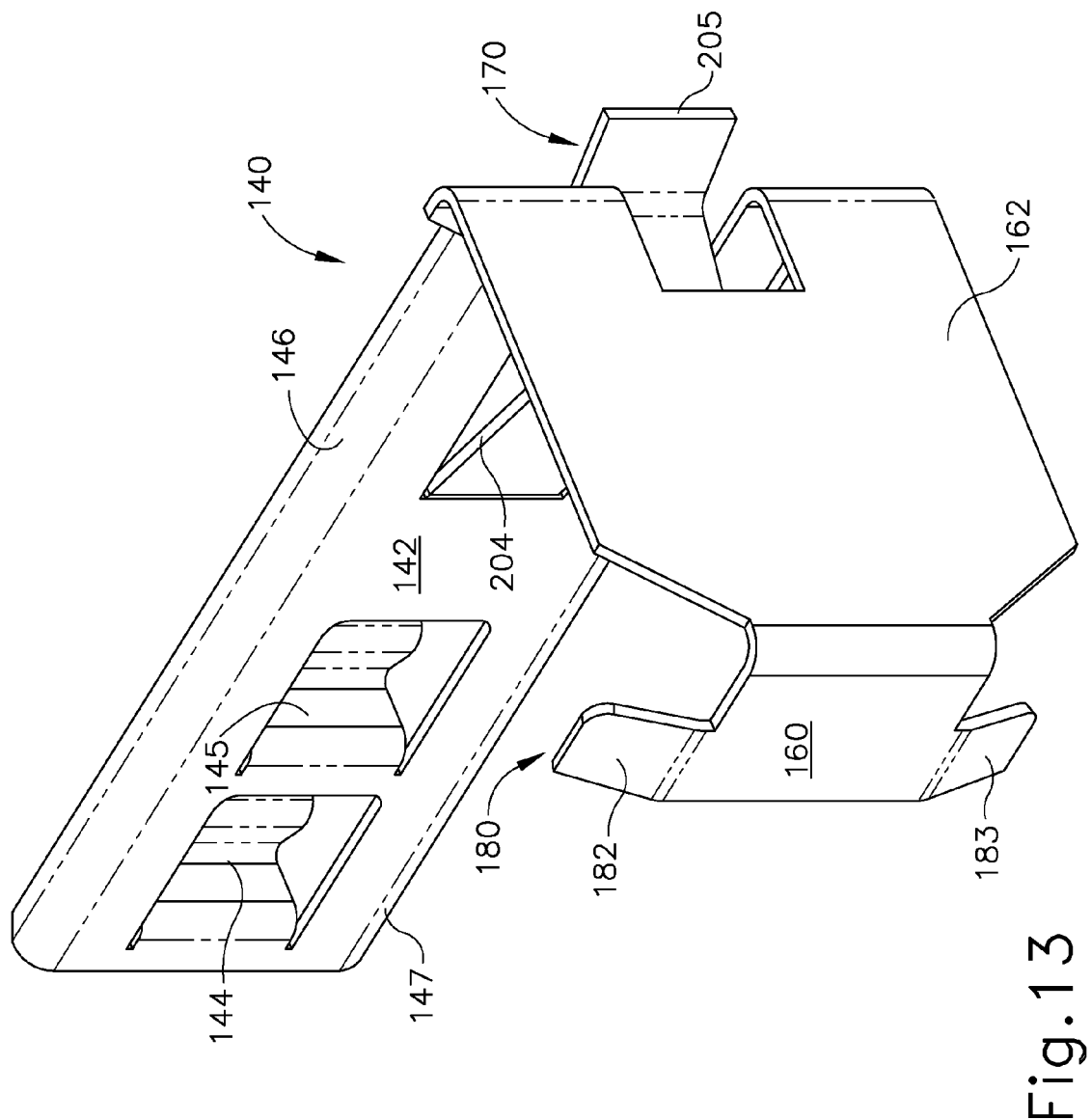
FIG. 13 depicts a first perspective view of a second engaging tab for an electrical box support assembly for mounting an electrical box between a pair of studs, in accordance with one embodiment.

With reference to FIGS. 5 and 8, steel studs 110 each include an open face 112, a closed face 114 and a pair of side faces 128, 129 extending from the closed face 114. Each stud 110 also includes a pair of opposing bulges 116, 117 formed on the closed face 114 a distance less than a distance $d_3$ from each side face 128, 129 and first and second edges 118, 119 extending a distance less than a distance $d_3$ from each side face 128, 129.

With reference to FIG. 1, electrical box support assembly 100 is mounted between and connected with a pair of studs 110, and includes a pair of first and second telescoping overlapping struts 120, 130 and a pair of first and second engaging tabs 140, 190 detachably coupled with each end 124, 134 of the pair of first and second telescoping overlapping struts 120, 130. Second telescoping strut 130 overlaps first telescoping strut 120, as first telescoping strut 120 slides underneath and telescopes out from second telescoping strut 130. By making the first and second struts 120, 130 telescoping, the combined length $L_1$ of the struts 120, 130 can be varied to match the distance $d_1$ between the pair of studs 110, and allowing for easier mounting of the electrical box support assembly 100 with the studs 110. Each telescoping strut 120, 130 has a face 122, 132, respectively, to which the electrical box 102 may be secured. Preferably, each face 122, 132 includes a mounting device, such as an opening 126 or clip, through which the electrical box 102 may be secured.

First and second engaging tabs 140, 190 are detachably coupled with each end 124, 134 of the pair of first and second telescoping overlapping struts 120, 130 and are capable of coupling with a stud 110. Preferably, first and second engaging tabs 140, 190 are mirror images of each other, and as a result, for simplicity only the structure of first engaging tab 140 will be discussed herein, as the structure of the second engaging tab 190 would be duplicative since mirror images both contain the same or similar elements. With reference to FIGS. 2-12, shown are various views of first engaging tab 140.

First engaging tab 140 includes a first engagement member 142 facing a second engagement member 160, a side engagement member 162 connecting the first and second engagement members 142, 160 together, and a first compressible member 170 extending from either the first engagement member 142 or the second engagement member 160. First engagement member 142 and second engagement member 160 straddle opposing sides of stud 110 and form a U-shaped member along with side engagement member 162 in order to warp around stud 110 so as to better secure the electrical box support assembly to the stud 110. Preferably, each engaging member 142, 160, 162 includes a generally flat face 143, 161, 163, respectively, which preferably engages or partially or fully rests against a respective side or feature of the stud 110, as shown in FIGS. 2, 5, and 8.

Figure 2:
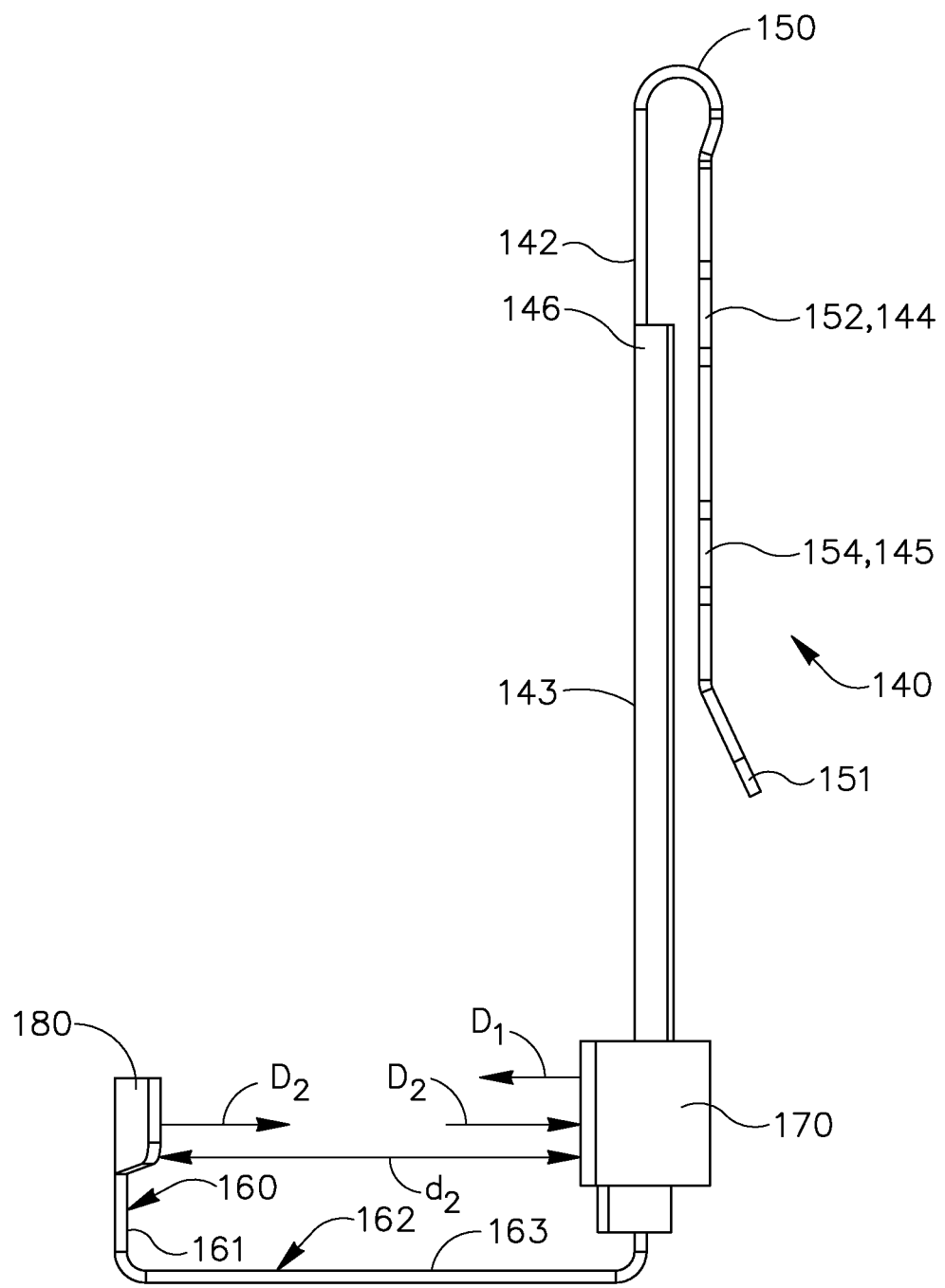
FIG. 2 depicts a first side view of a first engaging tab for the electrical box support assembly shown in FIG. 1 for mounting an electrical box between a pair of studs, in accordance with one embodiment.
Figure 3:
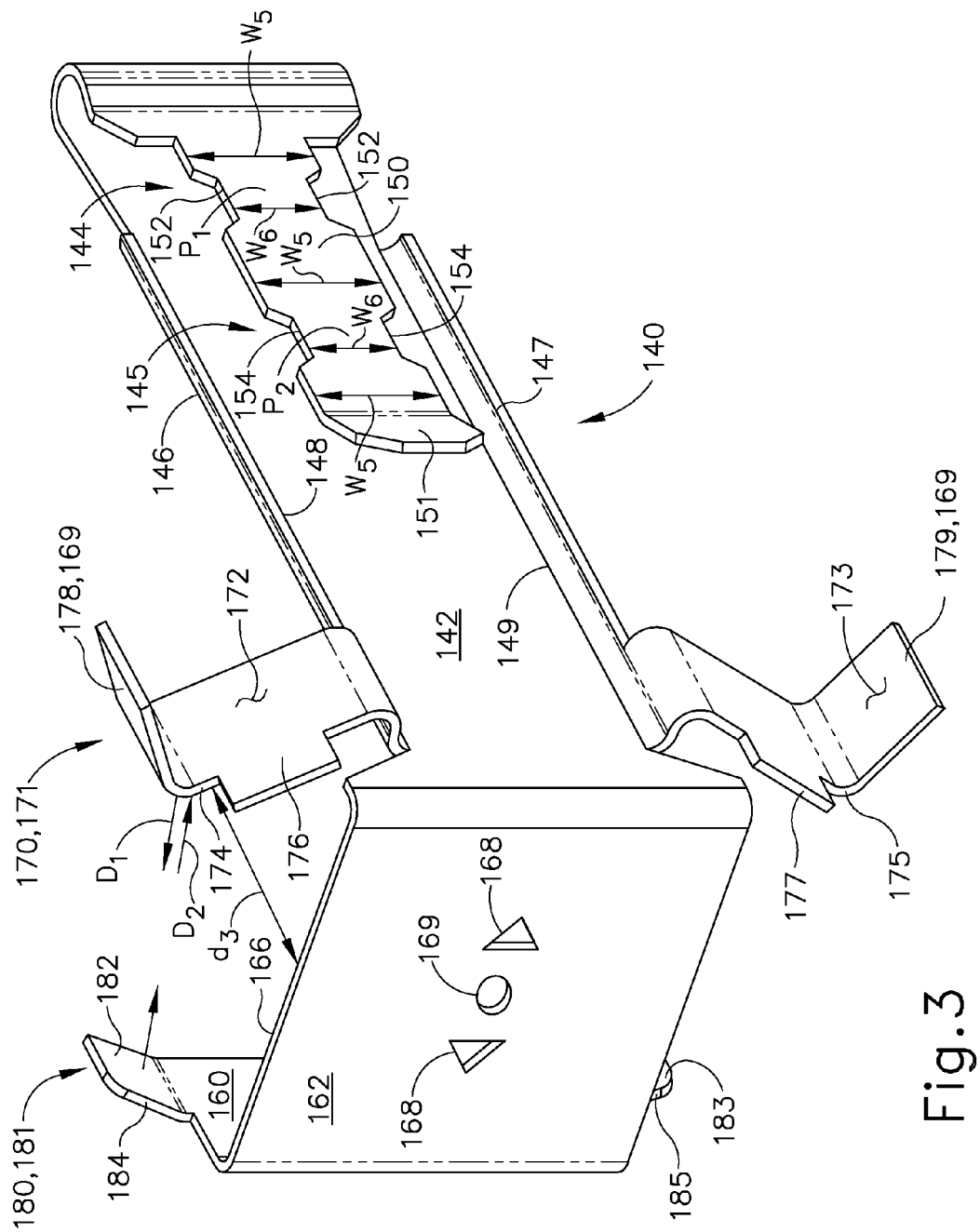
FIG. 3 depicts a first perspective view of the first engaging tab shown in FIG. 2 for mounting an electrical box between a pair of studs, in accordance with one embodiment.

With reference to FIGS. 2 and 3, in one embodiment, first compressible member 170 extends in a first direction $D_1$ from the first engagement member 142 towards the second engagement member 160 and the first compressible member 170 is compressible in a second direction $D_2$ opposite that of the first direction $D_1$. Compressible member 170 is any type of compressible device or member which can be compressed and upon compression, which applies a force $F_1$, as shown in FIG. 8, in a direction which is opposed to that of the direction in which the member 170 is compressed. Preferably, a distance $d_2$ between the compressible member 170 and the nearest point of member 162 is less than the width $W_1$ or $W_2$ of the stud 110. As a result, during installing of engaging tab 140 around stud 110, as shown in FIG. 8, compressible member 170 is compressed in a direction $D_2$ and applies a force $F_1$ in a direction $D_1$ which is opposed to direction $D_2$ against the stud 110. Preferably, force $F_1$ is greater than, and preferably much greater than, the weight of the electrical box support assembly 100, allowing for the engaging tab 140 to connect with and engage stud 110 and support the weight of the electrical box support assembly 100 along with engaging tab 190. In one embodiment, an additional fastening member, such as a screw or nail, is used to further secure engaging tab 140 to stud 110. By using a u-shaped engaging tab 140 having a pair of opposing engagement members 142, 160, and by having a compressible member 170 extending from one of the opposing engagement members 142, 160 and towards another of the opposing engagement members 142, 160, it is possible to readily mount and easily secure the electrical box support assembly 100 to any interior or exterior surface of a metal stud 110, or the exterior of a wood stud 110, preferably without the use of additional fasteners.

Figure 23:
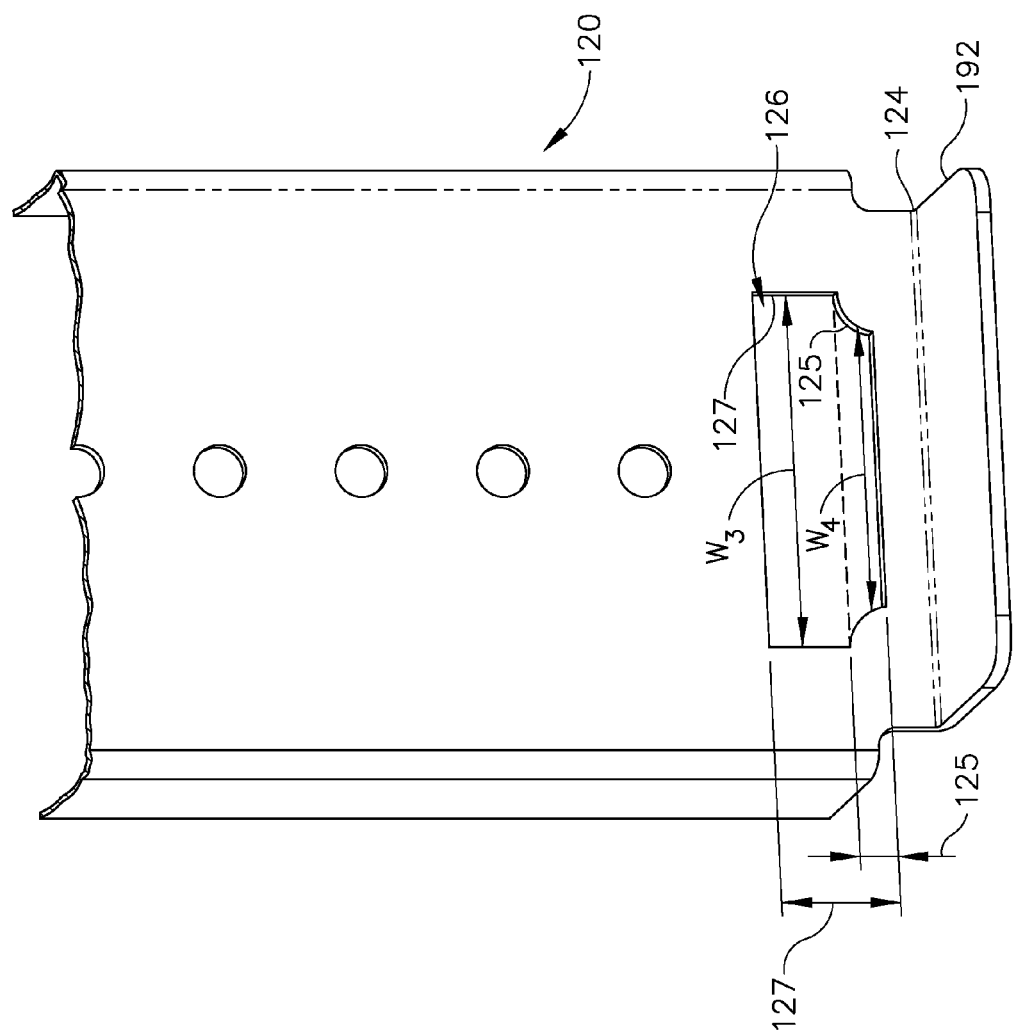
FIG. 23 depicts a perspective view of a first telescoping overlapping strut of the electrical box support assembly shown in FIG. 1 for mounting an electrical box between a pair of studs, in accordance with one embodiment.
Figure 24:
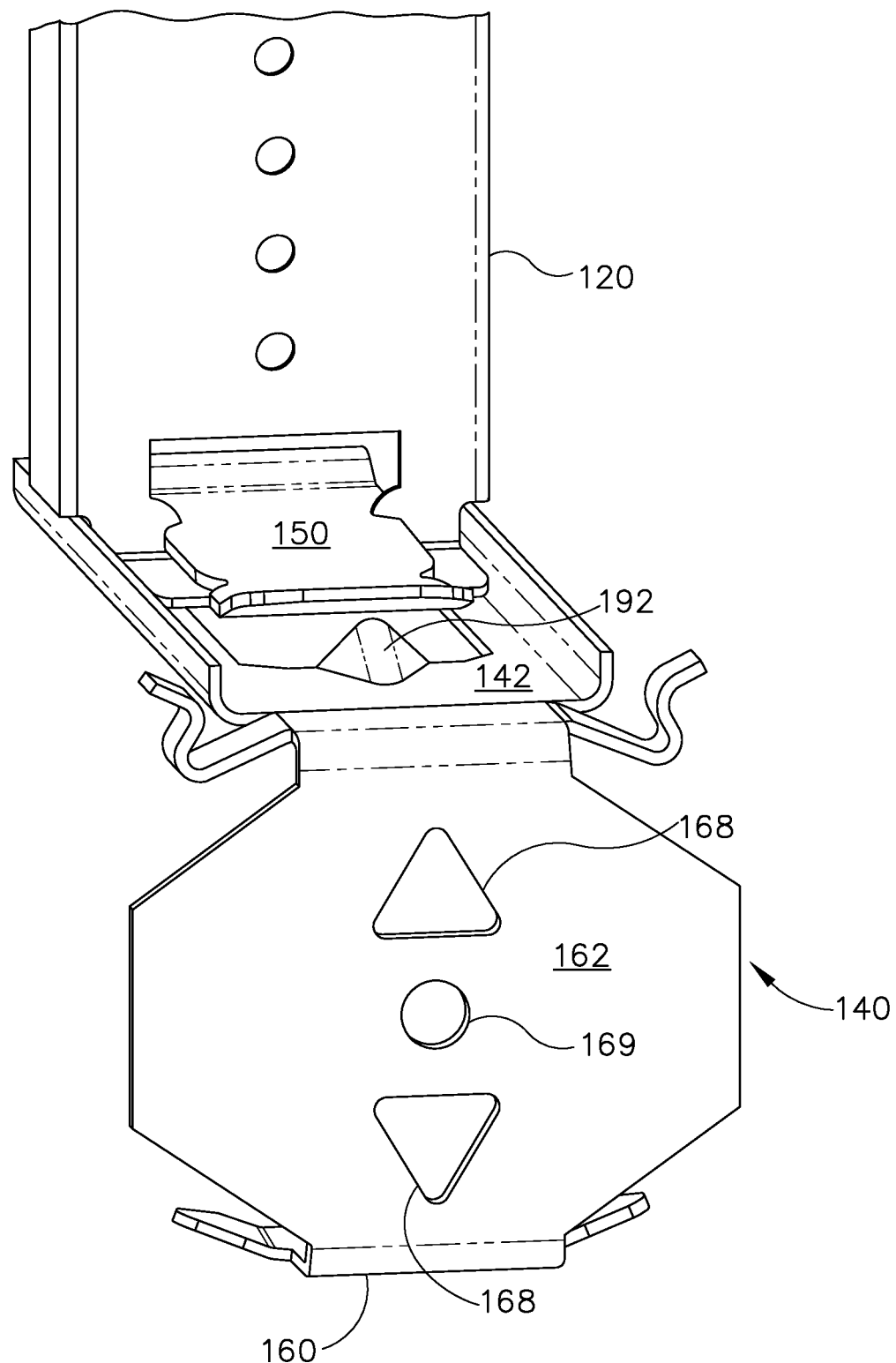
FIG. 24 depicts a perspective view of a first telescoping overlapping strut of the electrical box support assembly shown in FIG. 1 connected with a first engaging tab, in accordance with one embodiment.

With reference to FIGS. 3 and 23-24, each end 124, 134 of the pair of telescoping overlapping struts 120, 130, respectively, may be detachably coupled at one of two positions, $P_1$ or $P_2$, on first engaging tab 140 in order to accommodate electrical boxes 102 of varying depths. As used herein, the term detachably coupled or detachably secured refers to coupling or securing a first member to a second member in a manner in which the two members are designed to be unfastened or disconnected from each other without damage to either member. This allows for a user to disconnect or unfasten the two members from each other without damage so that a user may service the two members. Detachable couplings may include a snap-fit coupling, a frictionally engaging coupling which includes members which frictionally engage each other, a threaded coupling, a magnetic coupling, and a mechanical coupling such as a hook and loop type fastener, or any other type of mechanical arrangement. Preferably, the first engaging tab 140 includes a pair of first and second coupling members 144, 145 which may be coupled with a respective opening or coupling member 192 formed on or near each end 124, 134 of the struts 120, 130, as shown in FIG. 23.

With reference to FIGS. 3 and 23-24, in one embodiment, coupling members 144, 145 are formed on an engagement tongue 150 connected with the first engagement member 142, whereupon each coupling member 144, 145 forms a pair of inwardly facing notches 152, 154, respectively. Each pair of inwardly facing notches 152, 154 engages and is detachably coupled with an engagement opening 126. Preferably, as shown in FIG. 23, the engagement opening 126 is T-shaped and has a release portion 127 with a width $W_3$ and a locking portion 128 with a width $W_4$ which is less than the width $W_3$. In order to detachably couple an end 124 of strut 120 to engaging tab 140, engagement tongue 150 has a nominal width $W_5$, which is greater than $W_4$ but less than $W_3$, allowing the engagement tongue 150 to pass through the release portion 127. Each pair of inwardly facing notches 152, 154 causes reduces width of the engagement tongue 150 from the nominal width $W_5$ to a reduced width $W_6$. Since the reduced width $W_6$ is less than the width $W_4$ of the locking portion 125, either coupling member 144 or 145 is able to rest within the locking portion 125 and detachably couple the first engaging tab 140 to the first telescoping strut 120. Preferably, engagement tongue 150 is biased downwards and towards the first engaging member 142, biasing either coupling member 144 or 145 to rest within the locking portion 125. Preferably, engagement tongue 150 includes a bent flap 151 at an open end of the engagement tongue 150 for lifting the engagement tongue 150 upwards and away from the first engaging member 142, moving either coupling member 144 or 145 away from the locking portion 125 and into the release portion 127, allowing a user to detach the first telescoping strut 120 from the first engaging tab 140 or to reposition the first telescoping strut 120 from one position $P_1$ to a second position $P_2$.

With reference to FIGS. 3 and 23-24, in one embodiment, coupling members 144, 145 are formed on and extend from first engagement member 142, whereupon each coupling member 144, 145 forms a pair of curved V-shaped brackets 157, 158, respectively. Each curved V-shaped bracket 157, 158 engages and is detachably coupled with the engagement opening 126 and has a lip 164, 165, respectively, which a user may move up and away from the first engagement member 142 in order to release and decouple each V-shaped bracket 157, 158 from the engagement opening 126 and the stud 120.

With reference to FIGS. 3-12, in one embodiment, wherein at least one of and preferably each pair of engaging tabs 140, 190 further includes a second compressible member 180 extending from the second engagement member 160 in a second direction $D_2$ opposite that of the first direction $D_1$ and towards the first engagement member 142. Second compressible member 180 is any type of compressible device or member which can be compressed and upon compression, which applies a force $F_2$, as shown in FIG. 5, in a direction which is opposed to that of the direction in which the member 180 is compressed. Preferably, a distance $d_2$ between the second compressible member 180 and the nearest point of member 162 is less than the width $W_1$ or $W_2$ of the stud 110. As a result, during installing of engaging tab 140 around stud 110, as shown in FIG. 5, compressible member 180 is compressed in a direction $D_1$ and applies a force $F_2$ in a direction $D_2$ which is opposed to direction $D_1$ against the stud 110. Preferably, force $F_2$ is greater than, and preferably much greater than, the weight of the electrical box support assembly 100, allowing for the engaging tab 140 to connect with and engage stud 110 and support the weight of the electrical box support assembly 100 along with engaging tab 190.

Figure 26:
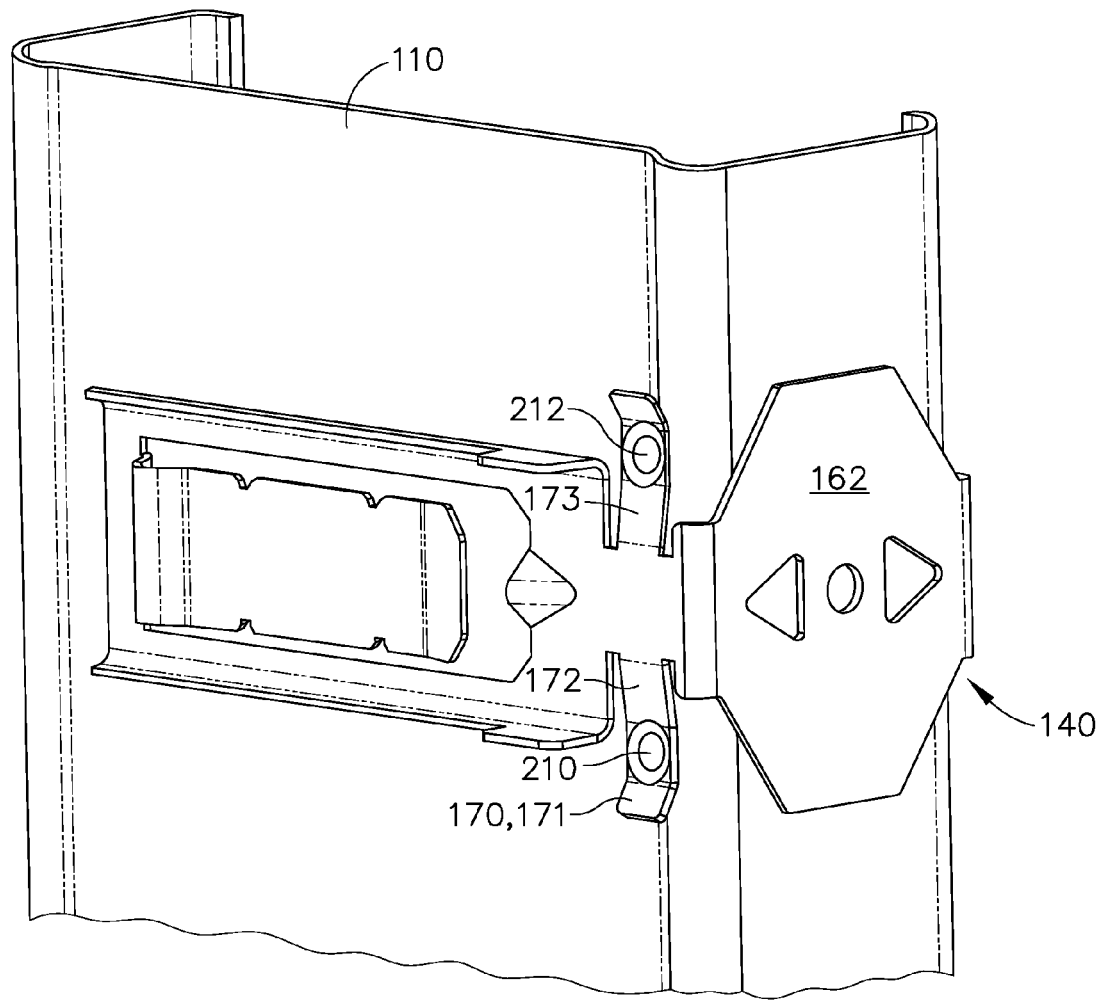
FIG. 26 depicts a second perspective view of the engaging tab shown in FIG. 25 connected with a stud in a first manner, in accordance with one embodiment.

With reference to FIGS. 3, 4, 7, and 10, in one embodiment the first compressible member 170 forms a compressible winged structure 171 having a pair of winged members 172, 173 which slant inwardly in the first direction $D_1$. Preferably, each winged member 172, 173 is V-shaped and connected with the first engagement member 142. Preferably, each winged member 172, 173 includes a trailing edge 174, 175 respectively, which is a distance $d_3$ from an inward surface 166 of the side engagement member 162. With reference to FIG. 26, in one embodiment, each winged member 172, 173 includes an indentation 210, 212 formed in and extruded from each winged member 172, 173. Preferably, each indentation 210, 212 is semi-spherically shaped or semi-ovoidally shaped. Each indentation 210, 212 is able to better apply a force $F_1$ to the stud 110 in order to more firmly mate the first engaging tab 140 with the stud 110.

Figure 27:
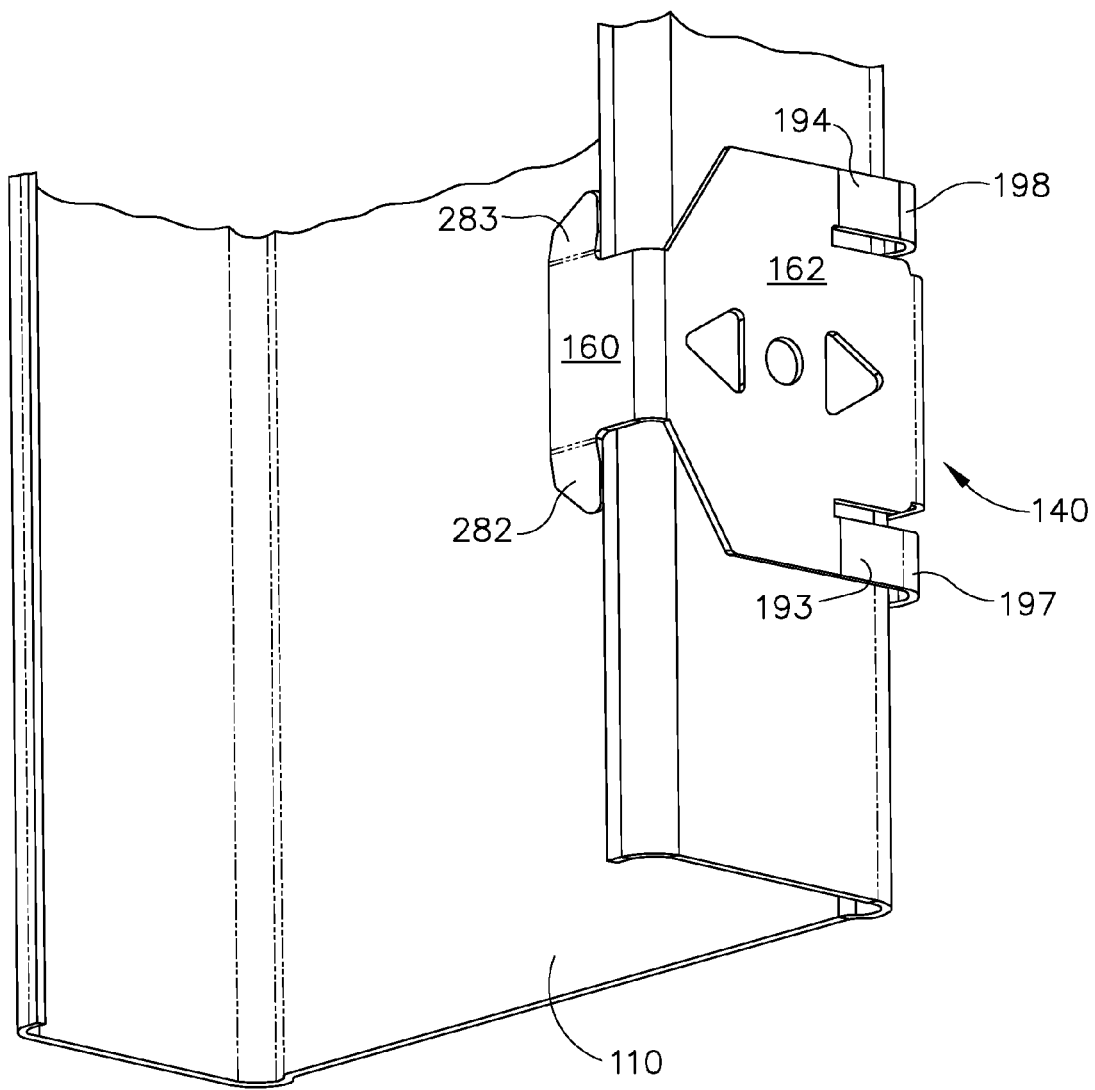
FIG. 27 depicts a first perspective view of an engaging tab connected with a stud in a first manner, in accordance with one embodiment.
Figure 28:
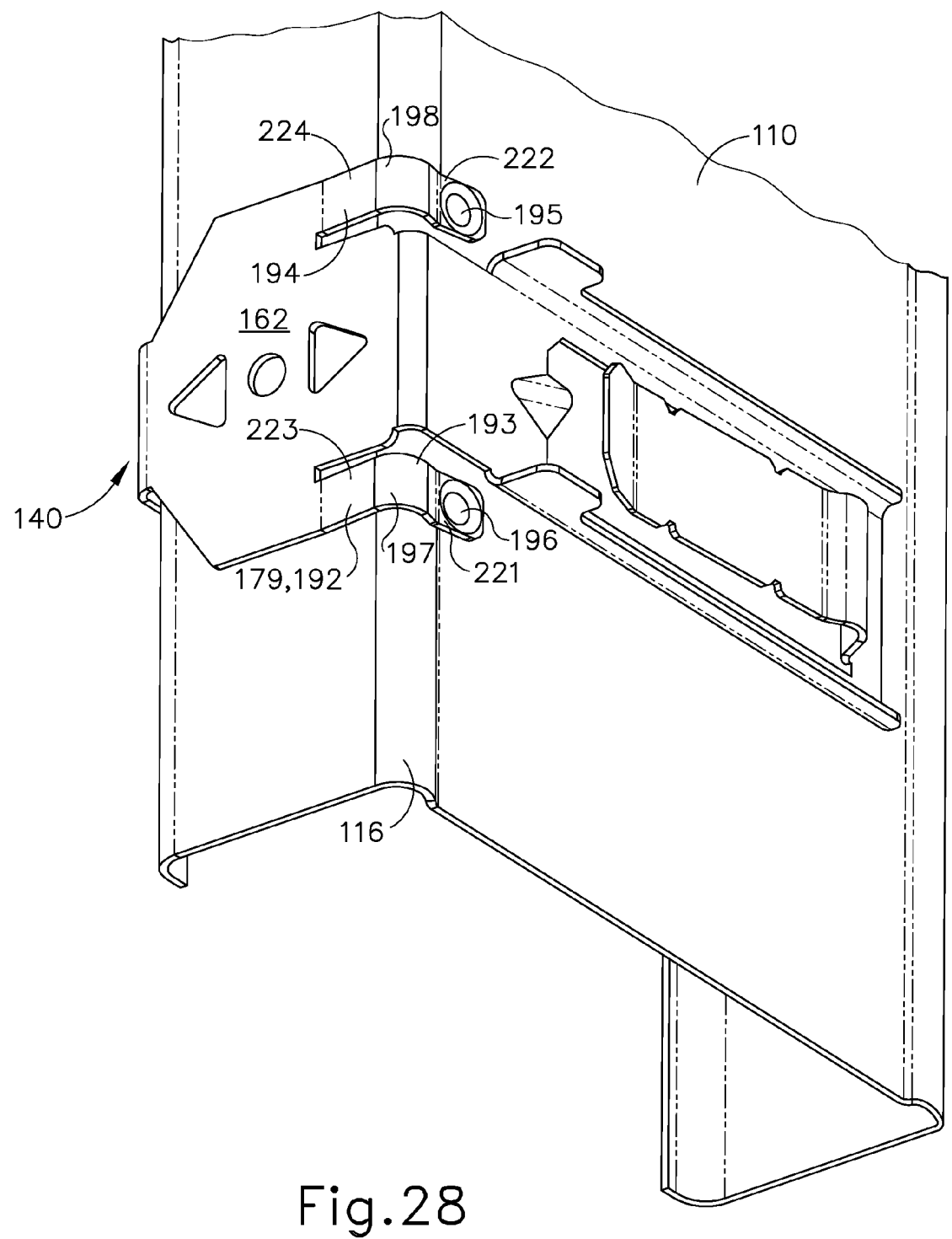
FIG. 28 depicts a second perspective view of the engaging tab shown in FIG. 27 connected with a stud in a first manner, in accordance with one embodiment.

With reference to FIGS. 27 and 28, in one embodiment, the first compressible member 170 forms a pair of compressible fingers 193, 194 each of which extend from side engagement member 162, and each of which form a generally right-angle bend 197, 198, respectively, in order to wrap around either the first bulge 116 or the second bulge 117, or to wrap around a corner of the stub 110 nearest the first edge 118 or the second edge 119. Preferably, each compressible finger 193, 194 forms an indentation 195, 196 formed in and extruded from each compressible fingers 193, 194, preferably along a grasping portion 221, 222, connected with the corner portion 197, 198, respectively, which is in turn connected with an extending portion 223, 224 which is in turn connected with the side engagement member 162. Preferably, each indentation 195, 196 is semi-spherically shaped or semi-ovoidally shaped. Each indentation 195, 196 is able to better apply a force $F_1$ to the stud 110 in order to more firmly mate the first engaging tab 140 with the stud 110.

With reference to FIGS. 5 and 8, preferably, each stud 110 forms a bulge 116, 117 at a corner of the stud 110 and extending away from a flat surface formed on a closed face 114 of the stud 110 and a pair of edges 118, 119 which extend a distance of less than $d_3$ from each side face 128, 129 at the open face 112. Preferably, each bulge 116, 117 has a length of less than $d_3$, so that each trailing edge 174, 175 of each winged member 172, 173 may catch and rest against a bulge 116 or 117 or an edge 118 or 119, depending on how the first engaging tab 140 is mounted to the stud 110, further securing the electrical box support assembly 100 to the stud 110.

Figure 4:
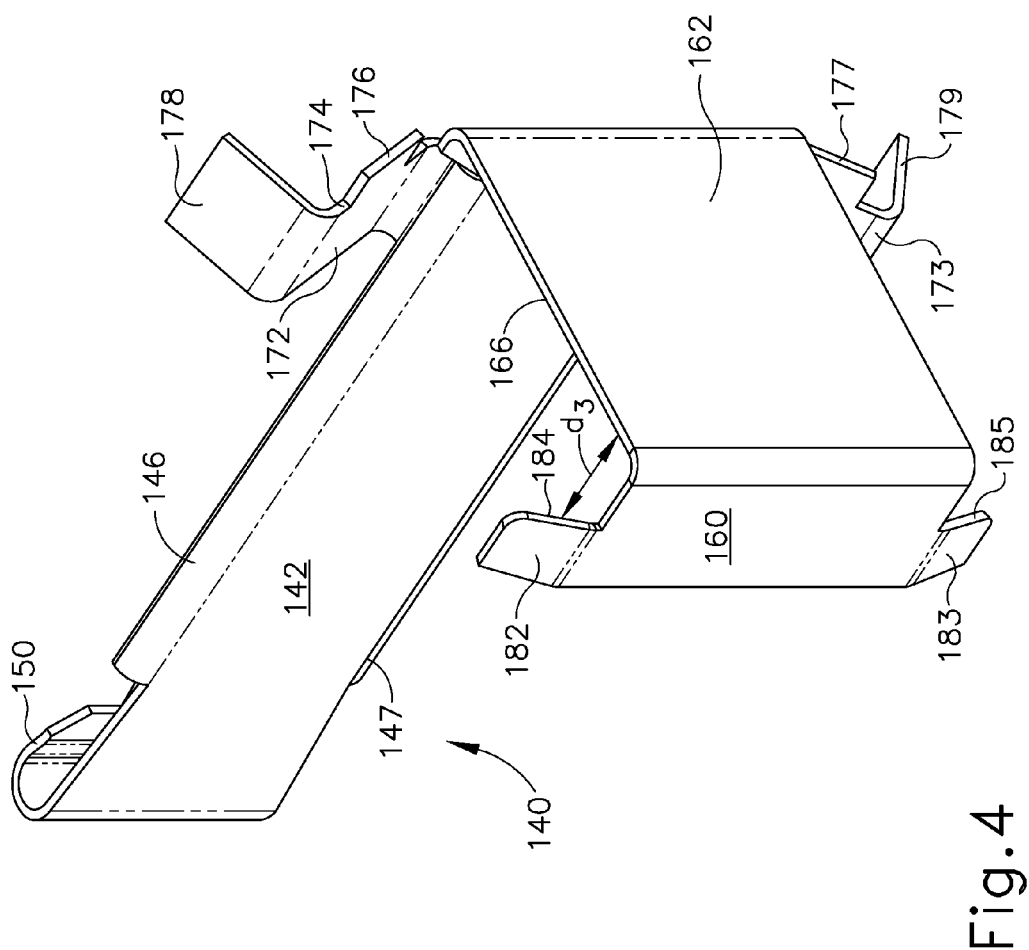
FIG. 4 depicts a second perspective view of the first engaging tab shown in FIG. 2 for mounting an electrical box between a pair of studs, in accordance with one embodiment.
Figure 25:
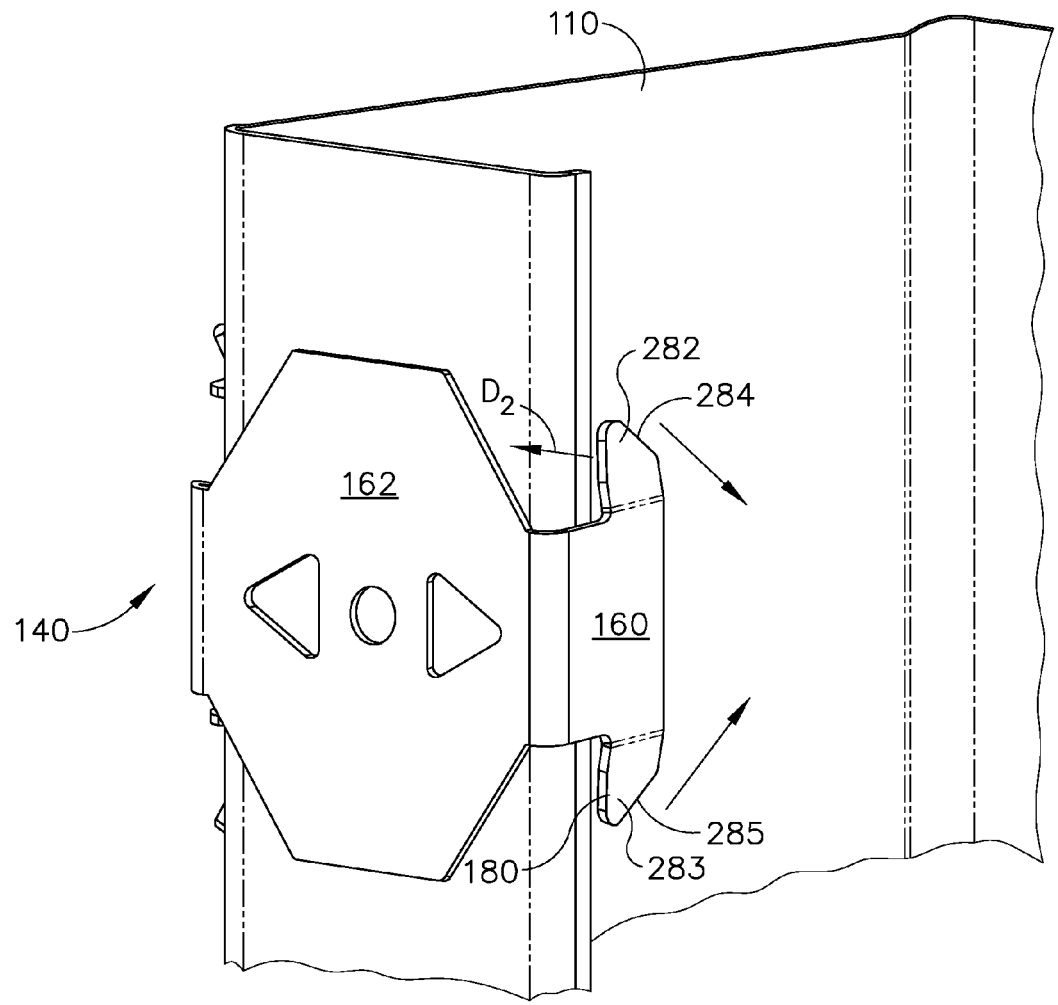
FIG. 25 depicts a first perspective view of an engaging tab connected with a stud in a first manner, in accordance with one embodiment.

With reference to FIG. 4, in one embodiment, the second compressible member 180 includes a pair of winged members 182, 183 which slant inwardly in the second direction $D_2$. Preferably, each winged member 182, 183 is V-shaped and connected with the second engagement member 162. In one embodiment, each winged member 182, 183 is simply just slanted inwardly, as shown in FIG. 4. Preferably, each winged member 182, 183 includes a trailing edge 184, 185 respectively, which is a distance $d_3$ from an inward surface 166 of the side engagement member 162. With respect to FIGS. 25 and 27, in one embodiment, the second compressible member 180 includes a pair of winged members 282, 283 which slant inwardly in the second direction $D_2$ and which include slanted upper edges 284, 285 which slant down towards and behind second engagement member 160, as shown in FIG. 25.

With reference to FIGS. 5 and 8, preferably, each stud 110 forms a bulge 116, 117 at a corner of the stud 110 and extending away from a flat surface formed on a closed face 114 of the stud 110 and a pair of edges 118, 119 which extend a distance of less than $d_3$ from each side face 128, 129 at the open face 112. Preferably, each bulge 116, 117 has a length of less than $d_3$, so that each trailing edge 184, 185 of each winged member 182, 183 may catch and rest against a bulge 116 or 117 or an edge 118 or 119, depending on how the first engaging tab 140 is mounted to the stud 110, further securing the electrical box support assembly 100 to the stud 110.

With reference to FIGS. 3, 4, 7, and 10, in one embodiment, each pair of winged members 172, 173 includes a tabbed member 176, 177 formed at and extending away from the trailing edge 174, 175. Each stud 110 forms an open face 112 between a pair of edges 118 and 119, and each edge 118 and 119 extends a distance $d_4$ from a side face 128, 129 of each stud 110. Since each edge 174, 175 is a distance $d_3$ from the inward surface 166, and since the distance $d_4$ is less than the distance $d_3$, each tabbed member 176, 177 and each trailing edge 174, 175 form a corner 186, 187 which traps an edge 118 or 119, depending on how the first engaging tab 140 is mounted to the stud 110, further securing the electrical box support assembly 100 to the stud 110.

With Reference to FIGS. 3 and 4, in one embodiment, the first engagement member 142 includes a pair of curved flanges 146, 147, each extending along opposing edges 148, 149 of first engagement member 142 and curving away from the second engagement member 160. The curved flanges 146, 147 are located on opposite sides of the first and second coupling members 144, 145 and aid in aligning and coupling the first telescoping strut 120 with the first engaging tab 140, as shown in FIG. 24.

Figure 14:
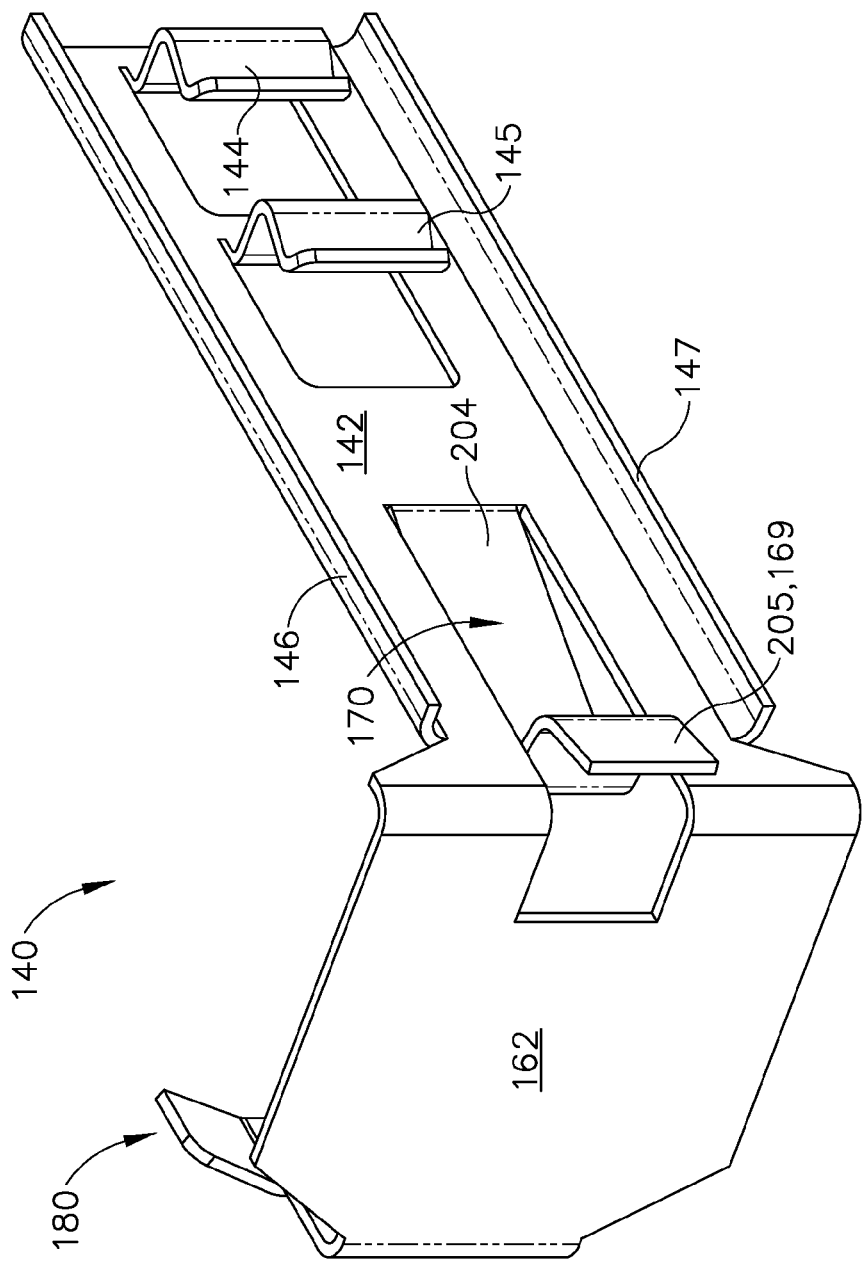
FIG. 14 depicts a second perspective view of the second engaging tab shown in FIG. 13 for mounting an electrical box between a pair of studs, in accordance with one embodiment.
Figure 15:
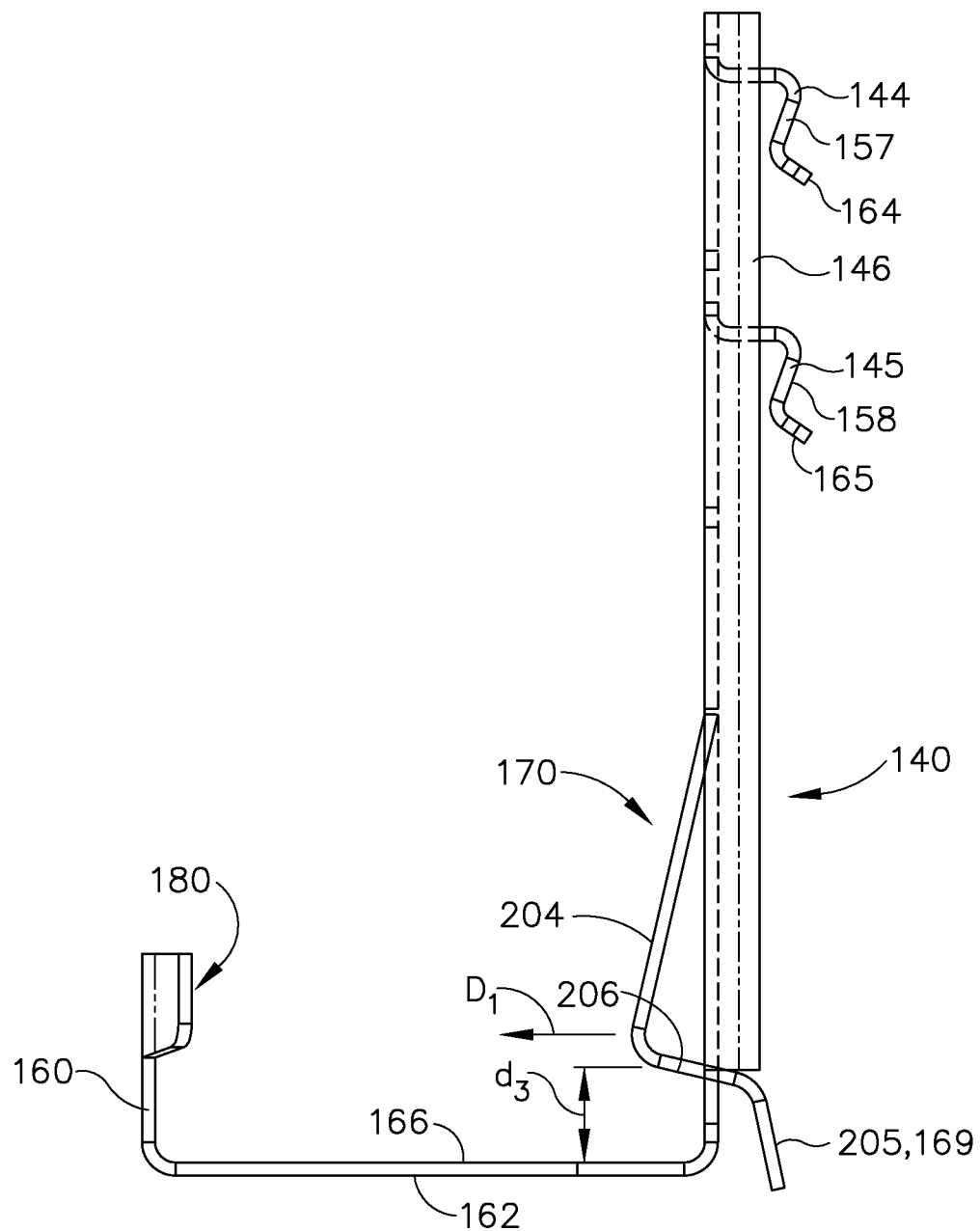
FIG. 15 depicts a first side view of the second engaging tab shown in FIG. 13 for mounting an electrical box between a pair of studs, in accordance with one embodiment.

With reference to FIGS. 3 and 14, in one embodiment, the first compressible member 170 includes a release tab 168 for moving the first compressible member 170 in the second direction $D_2$ and away from the stud 110. The release tab 168 aids a user in decoupling and removing the engaging tab 140 from or adjusting the engaging tab 140 against the stud 110.

Figure 16:
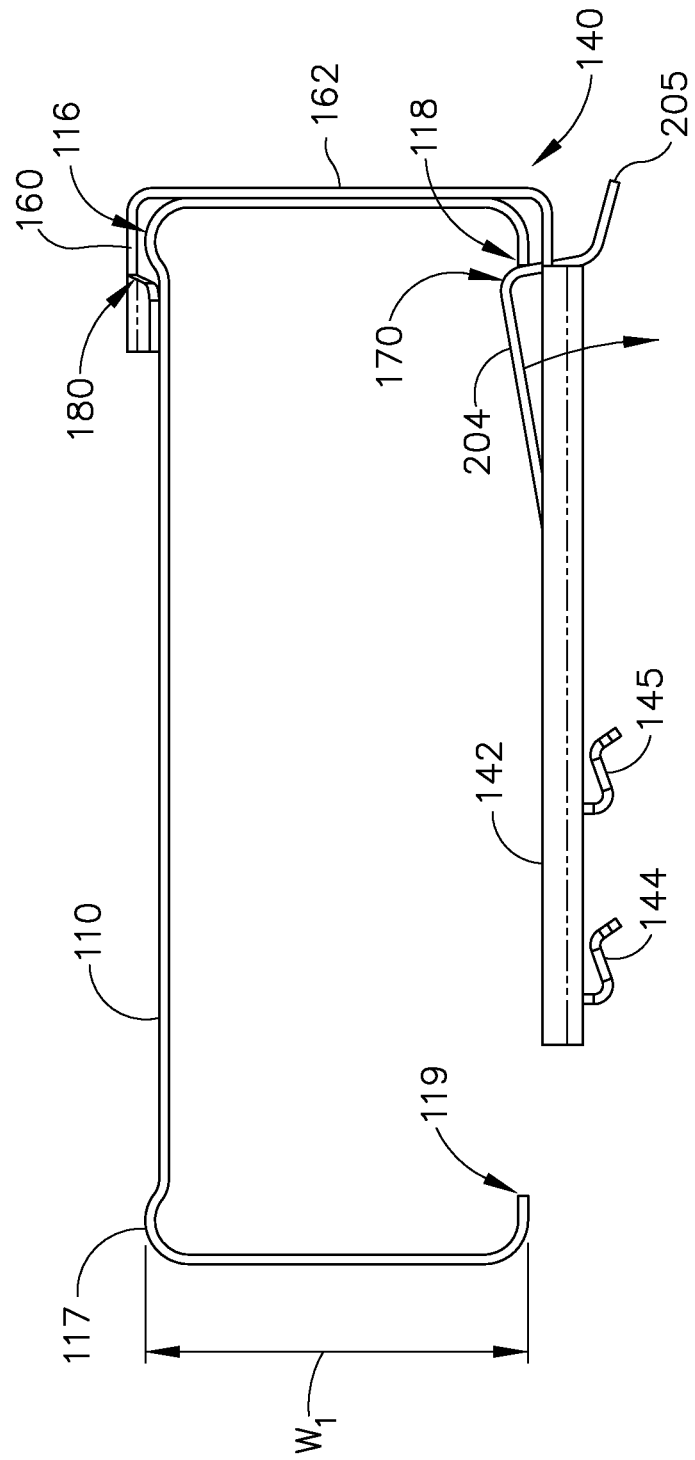
FIG. 16 depicts a second side view of the second engaging tab shown in FIG. 13 connected with a stud having a first width $W_1$ in a first manner, in accordance with one embodiment.
Figure 17:
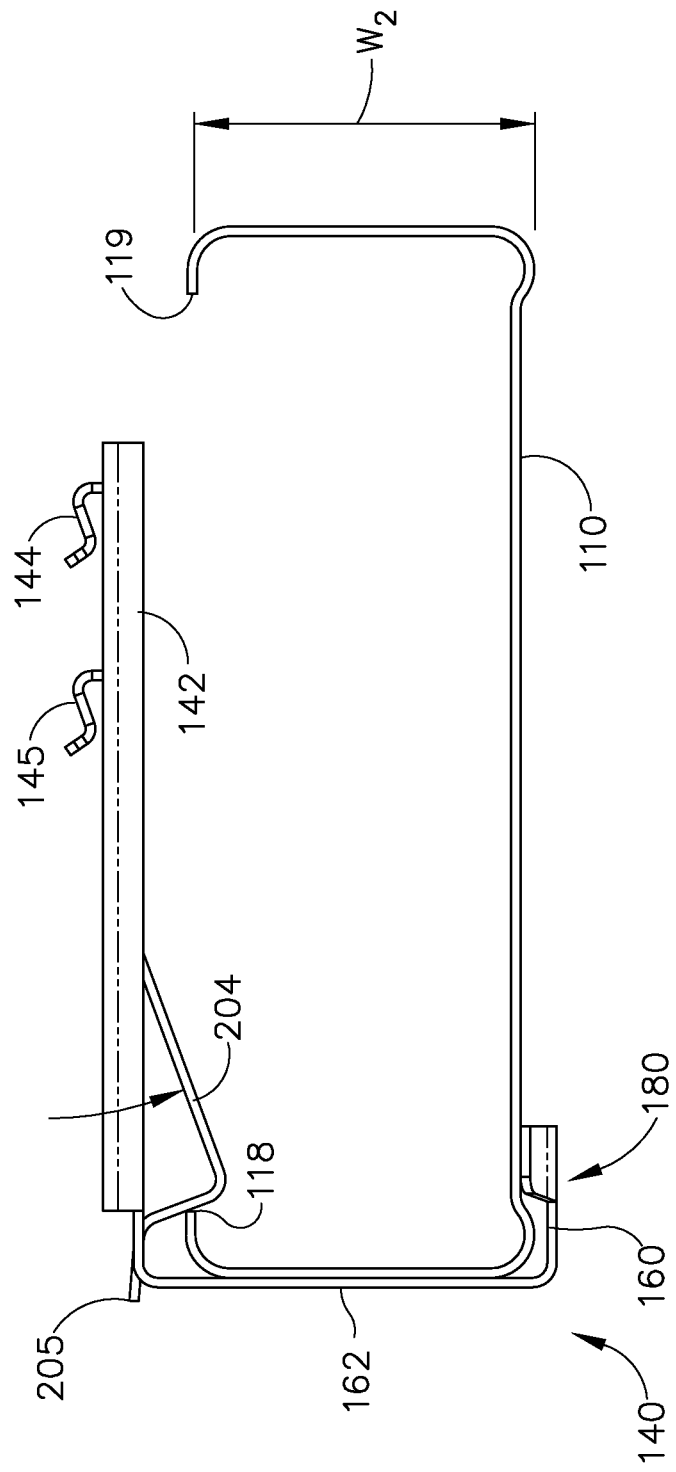
FIG. 17 depicts a second side view of the second engaging tab shown in FIG. 13 connected with a stud having a second width $W_2$ in a first manner, in accordance with one embodiment.
Figure 18:
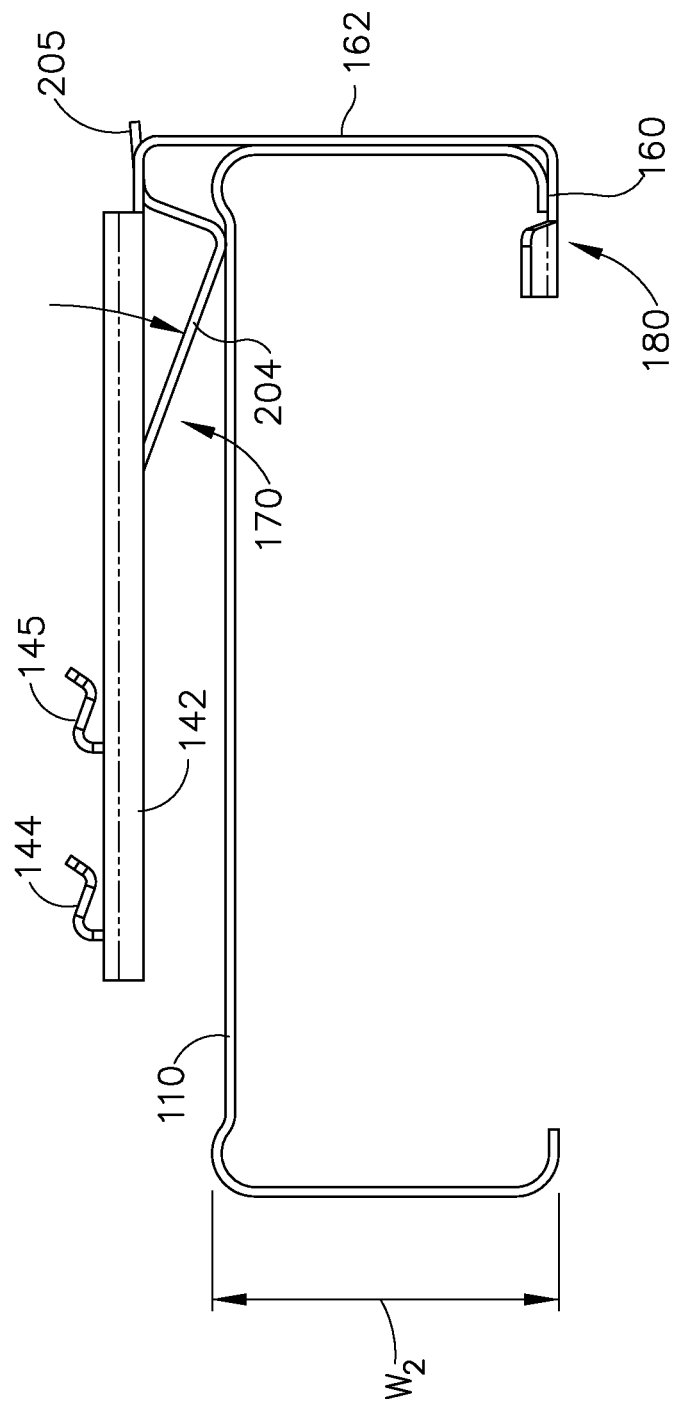
FIG. 18 depicts a side view of the second engaging tab shown in FIG. 13 connected with a stud having a second width $W_2$ in a second manner, in accordance with one embodiment.
Figure 19:
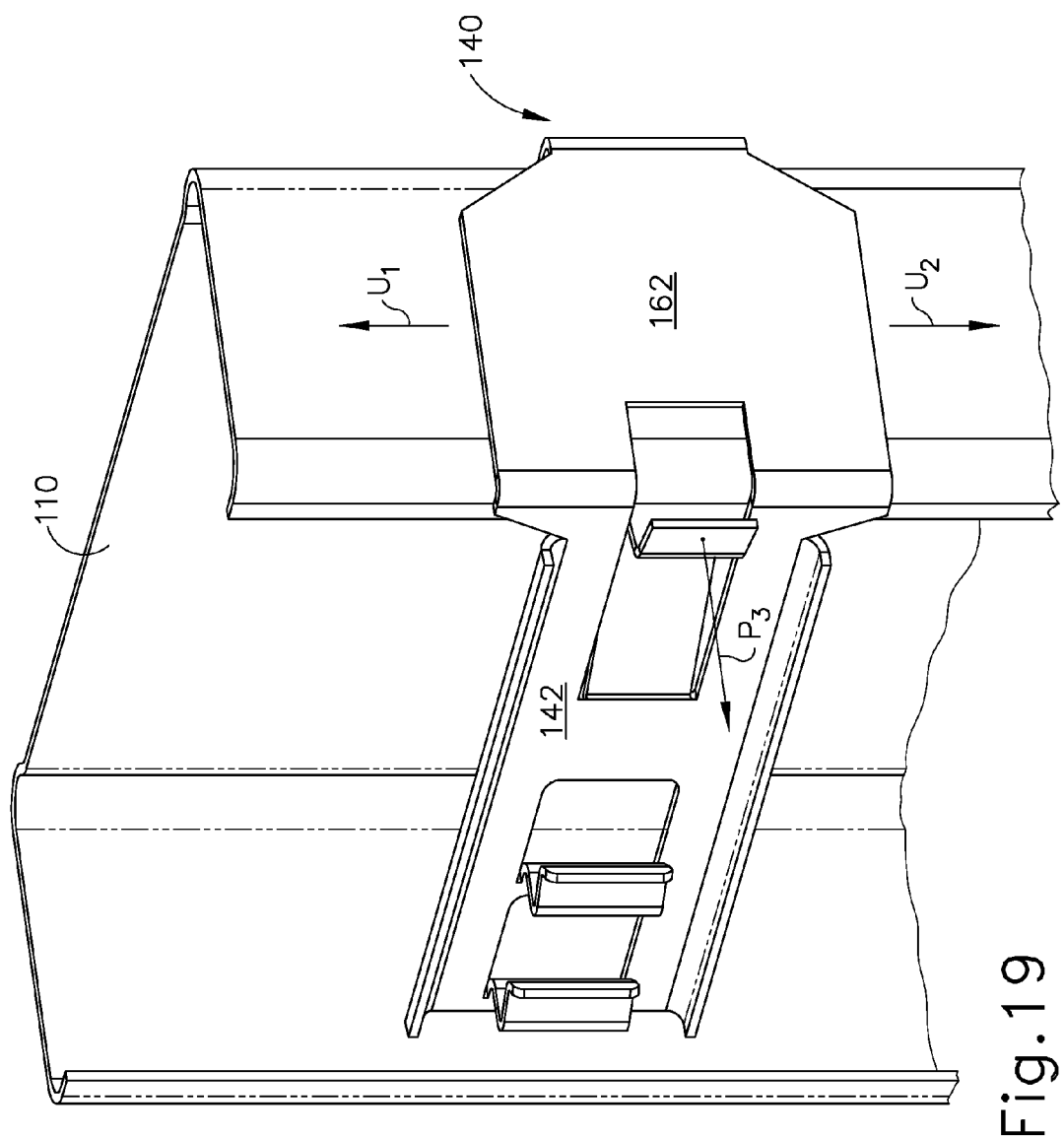
FIG. 19 depicts a first perspective view of the second engaging tab shown in FIG. 13 connected with a stud in a first manner, in accordance with one embodiment.
Figure 20:
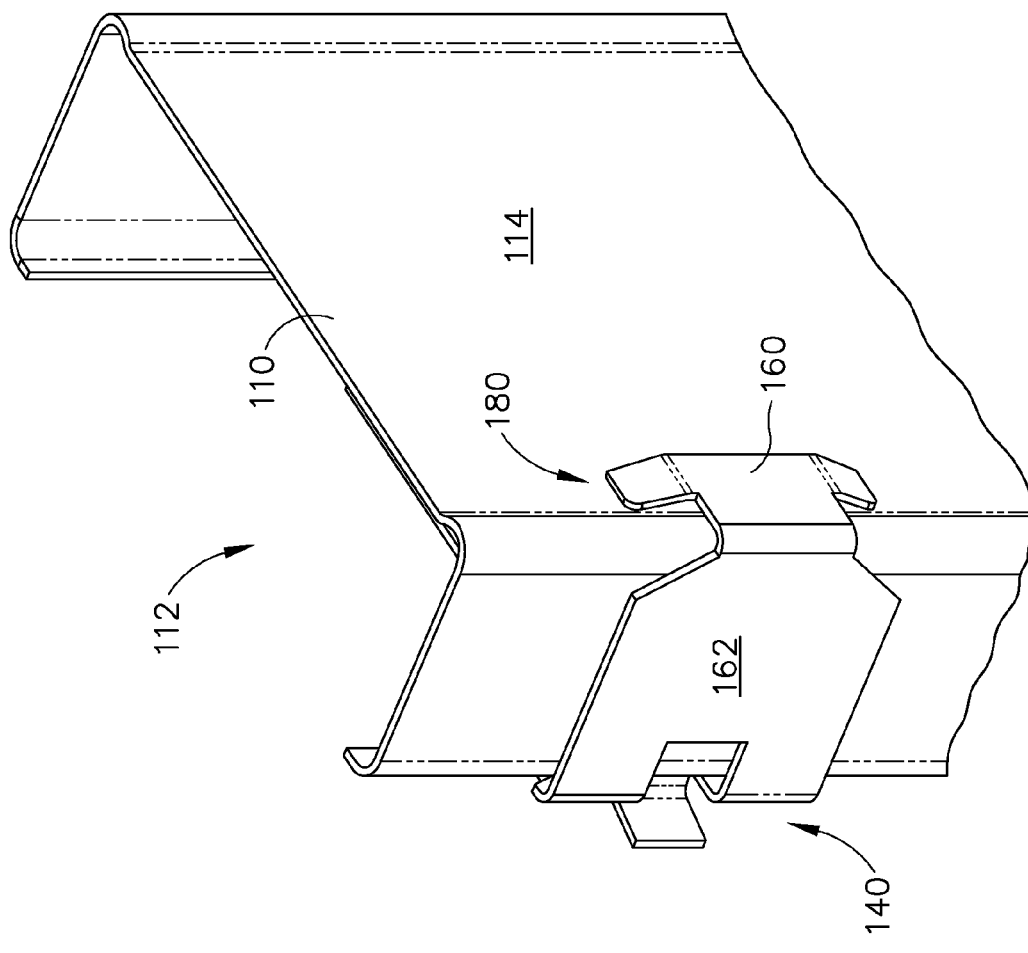
FIG. 20 depicts a second perspective view of the second engaging tab shown in FIG. 13 connected with a stud in a first manner, in accordance with one embodiment.
Figure 21:
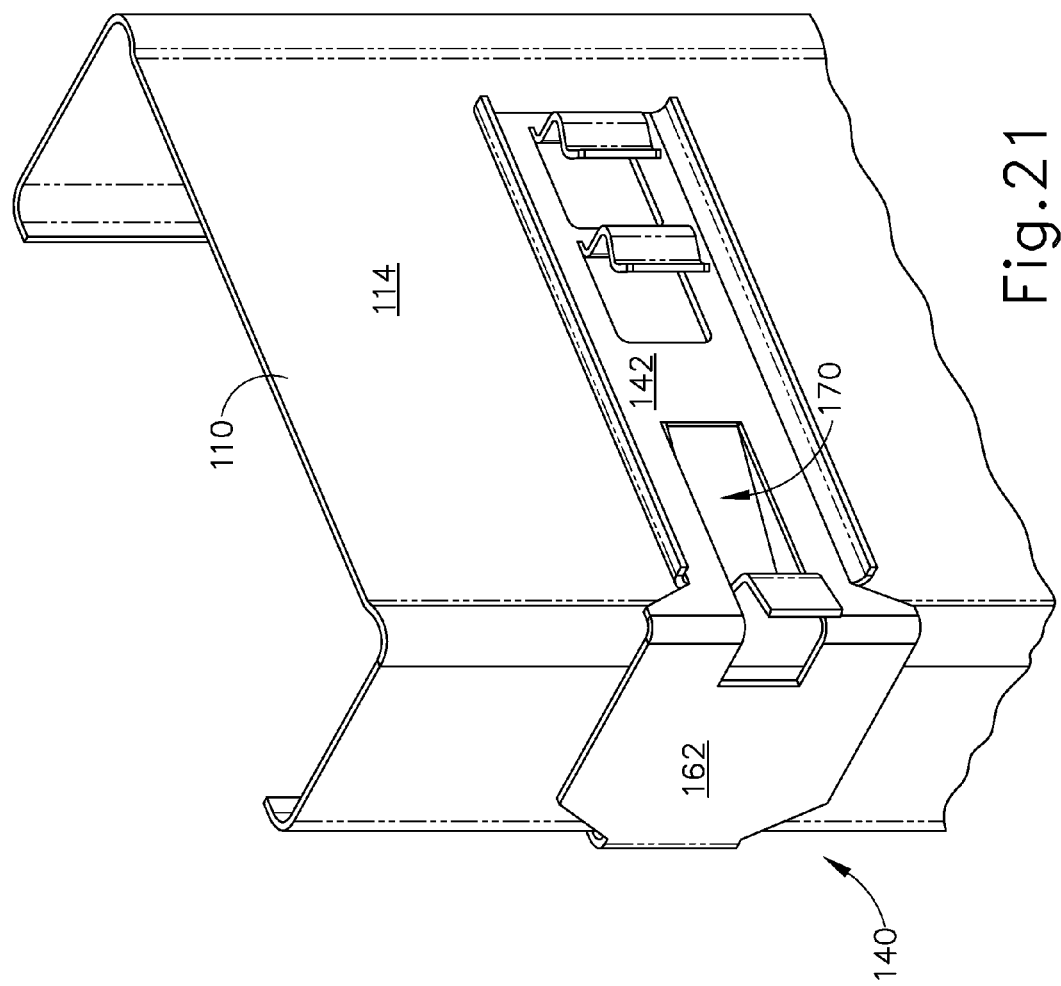
FIG. 21 depicts a first perspective view of the second engaging tab shown in FIG. 13 connected with a stud in a second manner, in accordance with one embodiment.
Figure 22:
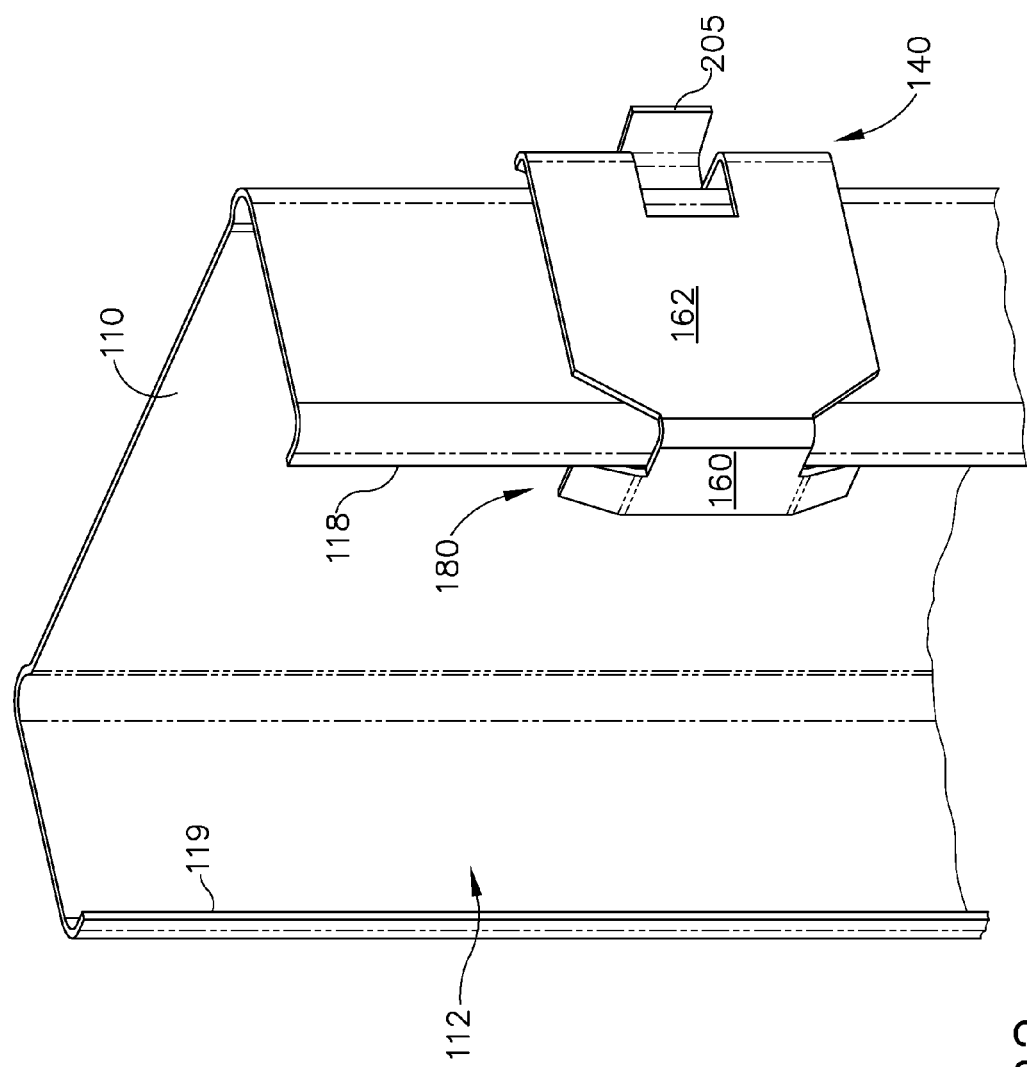
FIG. 22 depicts a second perspective view of the second engaging tab shown in FIG. 13 connected with a stud in a second manner, in accordance with one embodiment.

With reference to FIGS. 13-22, in one preferred embodiment, the first compressible member forms an L-shaped flat spring 204 which slant inwardly in the first direction $D_1$ and is connected with the first engagement member 142. Preferably, the L-shaped flat spring 204 includes a trailing edge 206 which is a distance $d_3$ from an inward surface 166 of the side engagement member 162. With reference to FIGS. 16 and 18, preferably, each stud 110 forms a bulge 116, 117 at a corner of the stud 110 and extending away from a flat surface formed on a closed face 114 of the stud 110 and a pair of edges 118, 119 which extend a distance of less than $d_3$ from each side face 128, 129 at the open face 112. Preferably, each bulge 116, 117 has a length of less than $d_3$, so that the trailing edge 206 of the L-shaped flat spring 204 may catch and rest against a bulge 116 or 117 or an edge 118 or 119, depending on how the first engaging tab 140 is mounted to the stud 110, further securing the electrical box support assembly 100 to the stud 110.

Preferably, the L-shaped flat spring 204 includes a release tab 205 for moving the first compressible member 170 in the second direction $D_2$ and away from the stud 110. The release tab 205 aids a user in decoupling and removing the engaging tab 140 from or adjusting the engaging tab 140 against the stud 110.

In one embodiment, the second engagement member 160 forms a pair of arrow-shaped alignment windows 168 sandwiching a fastening hole 169 through which a fastener, such as a nail or screw, may be inserted to further secure the electrical box support assembly 100 to the stud 110. The alignment windows 168 help a user to precisely align the electrical box support assembly 100 to a particular spot on the stud 110, which may or may not be pre-marked.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. An electrical box support assembly for mounting an electrical box between a pair of studs comprising:
   a pair of telescoping overlapping struts, wherein each strut has a face to which the electrical box is adapted to be secured; and
   a pair of engaging tabs detachably coupled with each end of the pair of telescoping overlapping struts, wherein each of the pair of engaging tabs includes:
      a first engagement member facing a second engagement member,
      a side engagement member connecting the first and second engagement members together, and
      a first compressible member extending from one of the first engagement member, the second engagement member, or the side engagement member, wherein a portion of the first compressible member extends in a first direction D1 either from the first engagement member towards the second engagement member or from the second engagement member towards the first engagement member, and wherein the portion of the first compressible member is compressible in a second direction D2 opposite that of the first direction D1, wherein the first compressible member includes a generally right angle bend to wrap around at least a portion of a stud and wherein the first compressible member includes an indentation extending in the first direction D1.

2. The electrical box support assembly of claim 1, wherein each end of the pair of telescoping overlapping struts is adapted to be detachably coupled at one of two positions on each engaging tab in order to accommodate electrical boxes of varying depths.

3. The electrical box support assembly of claim 1, wherein each of the pair of engaging tabs further includes a second compressible member, wherein the first compressible member extends from the side engagement member and the portion of the first compressible member extends in the first direction D1 towards the second engagement member, and wherein the second compressible member extends from the second engagement member in the second direction D2 and towards the first engagement member.

4. The electrical box support assembly of claim 1, wherein the first engagement member includes an engagement tongue having a pair of inwardly facing notches adapted to detachably couple within a T-shaped opening formed at each end of the pair of telescoping overlapping struts.

5. An electrical box support assembly for mounting an electrical box between a pair of studs comprising:
   a pair of telescoping overlapping struts, wherein each strut has a face to which the electrical box is adapted to be secured; and
   a pair of engaging tabs detachably coupled with each end of the pair of telescoping overlapping struts, wherein each of the pair of engaging tabs includes:
      a first engagement member for primarily engaging a closed face of one of the studs,
      a second engagement member facing the first engagement member, the second engagement member for primarily engaging an open face of one of the studs,
      a side engagement member connecting the first and second engagement members together, and
      a first compressible member extending from one of the first engagement member, the second engagement member, or the side engagement member, and wherein a portion of the first compressible member extends in a first direction D1 from the first engagement member towards the second engagement member, wherein the first compressible member is compressible in a second direction D2 opposite that of the first direction D1, wherein the first compressible member includes an indentation extending in the first direction D1 and wherein the first compressible member includes a generally fight angle bend to wrap around at least a portion of a stud.

6. The electrical box support assembly of claim 5, wherein each of the pair of engaging tabs further includes a second compressible member extending from the second engagement member in a second direction D2 opposite that of the first direction D1 and towards the first engagement member.

7. The electrical box support assembly of claim 5, wherein each end of the pair of telescoping overlapping struts may be detachably coupled at one of two positions on each engaging tab in order to accommodate electrical boxes of varying depths.

8. An electrical box support assembly for mounting an electrical box between a pair of studs comprising:
   a pair of telescoping overlapping struts, each strut including an opening formed at a terminal end and having a face to which the electrical box is adapted to be secured; and a pair of engaging tabs detachably coupled with each end of the pair of telescoping overlapping struts, wherein each of the pair of engaging tabs includes:
- a first engagement member for primarily engaging a closed face of one of the studs, the first engagement member includes an engagement tongue having a plurality of pairs of notches, and
- a side engagement member connected generally perpendicular with the first engagement member,
- wherein the engagement tongue is positioned in the opening of the strut at one of the plurality of pairs of notches to detachably couple the engaging tab to the strut in order to accommodate electrical boxes of varying depths.

9. The electrical box support assembly of claim 8, wherein each of the pair of engaging tabs further includes a second engagement member and a first compressible member, wherein the second engagement member faces the first engagement member for primarily engaging an open face of one of the studs and the first compressible member extends from one of the first engagement member, the second engagement member, or the side engagement member, and wherein a portion of the first compressible member extends in a first direction D1 either from the first engagement member towards the second engagement member or from the second engagement member towards the first engagement member, and wherein the portion of the first compressible member is compressible in a second direction D2 opposite that of the first direction D1.

10. The electrical box support assembly of claim 9, wherein each of the pair of engaging tabs further includes a second compressible member extending from the second engagement member in a second direction D2 opposite that of the first direction D1 and towards the first engagement member.

11. The electrical box support assembly of claim 1, wherein the first compressible member extends from the side engagement member.

12. The electrical box support assembly of claim 1, wherein the indentation is semi-spherical in shape.

13. The electrical box support assembly of claim 5, wherein the first compressible member extends from the side engagement member.

14. The electrical box support assembly of claim 5, wherein the indentation is semi-spherical in shape.

15. The electrical box support assembly of claim 9, wherein the first compressible member extends from the side engagement member.

16. The electrical box support assembly of claim 9, wherein the first compressible member includes a generally right angle bend to wrap around at least a portion of a stud.

17. The electrical box support assembly of claim 9, wherein the first compressible member includes an indentation extending in the first direction D1.

18. The electrical box support assembly of claim 9, wherein the pair of notches are inwardly facing and the opening at each end of the pair of telescoping overlapping struts is T-shaped opening.

* * * * *